United States Patent
Okawara

(10) Patent No.: US 7,447,426 B2
(45) Date of Patent: Nov. 4, 2008

(54) OPTICAL APPARATUS AND LENS CONTROL METHOD

(75) Inventor: Hiroto Okawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 11/128,910

(22) Filed: May 13, 2005

(65) Prior Publication Data
US 2005/0254808 A1 Nov. 17, 2005

(30) Foreign Application Priority Data
May 14, 2004 (JP) ............................. 2004-145524

(51) Int. Cl.
*G03B 13/32* (2006.01)
(52) U.S. Cl. .................. 396/79; 359/695; 359/698; 359/383; 359/684; 359/694; 348/345; 348/347
(58) Field of Classification Search .................. 396/79; 359/695, 698
See application file for complete search history.

(56) References Cited

U.S. PATENT DOCUMENTS 5,949,586 A * 9/1999 Hirasawa et al. ............ 359/698
5,956,528 A * 9/1999 Tanaka ........................ 396/52
6,661,585 B2 * 12/2003 Okawara ..................... 359/697
2002/0067421 A1 * 6/2002 Tanaka et al. ............... 348/345
2004/0061949 A1 * 4/2004 Yakita et al. ................. 359/697

* cited by examiner

*Primary Examiner*—Melissa J Koval
*Assistant Examiner*—Fang-Chi Chang
(74) *Attorney, Agent, or Firm*—Cowan, Liebowitz & Latman, P.C.

(57) ABSTRACT

An optical apparatus is disclosed, which is capable of suppressing an image blur at the start of zooming. The optical apparatus comprises a memory storing data indicating the position of a second lens unit according to the position of a first lens unit, and a controller. The controller controls the drive width of the second lens unit at a third position with a first driving condition in a case where the drive of the first lens unit is started from a first position, and controls the drive width of the second lens unit at the third position with a second driving condition in a case where the drive of the first lens unit is started from a second position. The drive width of the second lens unit at the third position with the first driving condition is smaller than that with the second driving condition.

21 Claims, 14 Drawing Sheets

| n \ s | 0 | 1 | 2 | 3 | — | k | — | s |
|---|---|---|---|---|---|---|---|---|
| 0 | A00 | A01 | A02 | A03 | — | A0k | — | A0s |
| 1 | A10 | A11 | A12 | A13 | — | A1k | — | A1s |
| 2 | A20 | A21 | A22 | A23 | — | A2k | — | A2s |
| 3 | A30 | A31 | A32 | A33 | — | A3k | — | A3s |
| — | — | — | — | — | — | — | — | — |
| k | Ak0 | Ak1 | Ak2 | Ak3 | — | Akk | — | Aks |
| — | — | — | — | — | — | — | — | — |
| m | Am0 | Am1 | Am2 | Am3 | — | Amk | — | Ams |

FOCUS LENS POSITION: n → CLOSE

ZOOM LENS POSITION: W ← s → T

FIG. 11

OPTICAL APPARATUS AND LENS CONTROL METHOD

FIELD OF THE INVENTION

The present invention relates to lens control in optical apparatuses such as video cameras.

BACKGROUND OF THE INVENTION

Miniaturization of a camera body and image-taking (shooting) from as near position to an object as possible are requested in consumer use cameras with lenses. Therefore, an inner-focus lens is used mainly in the consumer use cameras, which corrects the movement of an image plane with the movement of a magnification lens by driving a correction lens according to cam track data without mechanically interlocking the correction lens and the magnification varying lens using a cam, and performs focusing by driving the correction lens. The cam track data instructs the movement track of the correction lens and are stored in a microcomputer.

FIG. 7 shows the structure of a conventional inner focus lens system. In the Figure, 901 denotes a front lens, which is fixed, 902 denotes a zoom lens (magnification varying lens; it is also called as a variator) that is a first lens unit. Reference numeral 903 denotes a stop, and 904 denotes a fixed lens. Reference numeral 905 denotes a focus lens as a second lens, which has a focusing function and a correcting function (that is, a compensating function) that corrects the movement of the image plane with magnification. Reference numeral 906 denotes an image-pickup surface.

The position of the focus lens 905 to form an object image on the image-pickup surface 906 is changed according to object distances even though the focal length of the lens system is not changed because the focus lens 905 has the compensating function and the focusing function in the lens system shown in FIG. 7. FIG. 8 shows cam tracks that are formed by continuously plotting the positions of the focus lens 905 to form the object image on the image-pickup surface 906 when the object distance is changed in each focal length. By selecting one from the cam tracks according to the object distance and driving the focus lens 905 along the selected cam track, variation of the magnification (zoom) with an in-focus state maintained can be performed.

In a lens system in which focusing is performed using a front lens, a focus lens is provided independently for the zoom lens, and furthermore the zoom lens and the focus lens are mechanically interlocked with a cam ring. Therefore, when an operator rotates the cam ring manually and rapidly to change the focal length, the cam ring can rotate according to the operation. Since the zoom lens and the focus lens are driven in the optical axis direction by cams formed on the cam ring, an object image does not blur due to magnification if the focus lens is located at an in-focus position.

In contrast, in the inner focus lens system, it is common to select a cam track based on the positions of the focus lens and zoom lens from the plurality of cam tracks (they are also referred to as electrical cam tracks) or information corresponding to the cam tracks (the information can be given as a function of zoom lens positions), which are stored in a memory, and perform zooming by driving the focus lens along the selected cam track.

Here, the in-focus state can be maintained by driving the focus lens along the cam track when zooming from the telephoto side to the wide-angle side because the plurality of cam tracks converge from a state in which they have some degree of intervals, as shown in FIG. 8. However, the in-focus state cannot be maintained by the same method when zooming from the wide-angle side to the telephoto side because one cam track that the focus lens should follow from the convergent point of the plurality of cam tracks cannot be determined.

A control method has been disclosed in Japanese Patent Publication No. 2,795,439, in which a focus lens is driven in an out-of-focus direction from an in-focus position using an AF evaluation value signal (sharpness signal) obtained from the high-frequency component of a video signal, and furthermore driven in an in-focus direction by changing its driving condition. This is a so-called "zigzag correcting operation", which is a control method in which control for changing the following speed to the cam track is repeated. Thereby, the cam track that the focus lens should follow is corrected.

In addition, a method has been also disclosed in Japanese Patent Publication No. 2795439, in which the increase and decrease cycle of the sharpness signal is changed by changing the change amount of the following speed (driving condition) according to the object, focal length and depth of field to increase the accuracy of selection (determination) of the cam track that the focus lens should follow.

In the zigzag correcting operation disclosed in Japanese Patent Publication No. 2,795,439, the following speed to the cam track is changed according to the focal depth and focal length, etc. However, the AF evaluation value is changed according to not only the focusing state but also the change of object's pattern.

Therefore, to recover an error of change of the zigzag correcting operation direction (correction direction), the change amount of the following speed (correction intensity) is set according to the widening degree of the cam tracks in FIG. 8 so that, if the focus lens moves out of a right cam track that it should follow originally, it can return to the right cam track again.

Especially, in the telephoto side range in which the cam tracks disperse perfectly, if an error in determination of the cam track occurs once, it will take a long time to return the focus lens to the right cam track because of a long movement distance, and in the meantime, an image blur will occur. Therefore, by maximizing the correction intensity in the middle zoom range where the cam tracks start to disperse, the cam track is determined before the zoom position reaches the telephoto side range.

However, in the conventional control method in which the large correction intensity is set in the middle zoom range, there are the following problems.

In a case in which zooming is started from the middle zoom range where the correction intensity is large, the following speed correction corresponding to the correction intensity is performed from an in-focus state. The correction intensity in the middle zoom range is originally set so that the focus lens can be moved to an in-focus cam track according to the dispersion degree of the cam tracks. Therefore, in almost all cases where zooming is continuously performed from the wide-angle side to the middle zoom range, it is assumed that the focus lens is out of the in-focus cam track.

However, especially, in a case where zooming is started from an in-focus state in the middle zoom range, the zigzag correcting operation by the conventional control method causes an out-of-focus movement corresponding to the correction intensity to the focus lens. Although an image blur is not clearly visible in a taken-image when the object is fixed and the object distance is constant, a considerable image blur occurs when a camera work such as panning is performed or the object is moving. Because when the AF evaluation value is changed according to the change of the taken-image due to the camera work or the movement of the object, misjudgment of an in-focus direction is caused, and the misjudgment in a high correction intensity condition causes a large movement of the focus lens in an out-of-focus direction.

In addition, in a case where a low-contrast object is taken, the level of the AF evaluation value in an in-focus state is low, and the change amount of the AF evaluation value from an out-of-focus state to an in-focus state is small. However, strong correction of the focus lens to a side in which an image blur occurs according to the start of zooming causes a large image blur. In this case, if the correction direction is reversed, it is not possible to find a right cam track because an increasing amount of the AF evaluation value is small. Therefore, a situation in which zooming reaches the telephoto end with an image blur is caused.

BRIEF SUMMARY OF THE INVENTION

It is an object of the present invention to provide an optical apparatus and a lens control method for suppressing an image blur at the start of zooming.

According to one aspect of the present invention, an optical apparatus, which controls the drive of a second lens unit for correcting displacement of an image plane associated with the movement of a first lens unit for variation of magnification, comprises: a memory, which stores data indicating the position of the second lens unit according to the position of the first lens unit, the position of the second lens unit including a first position, a second position and a third position, the second position being nearer to the third position than the first position; and a controller, which generates lens control information based on the data, and controls the drive of the second lens unit based on the lens control information. The controller controls the drive width of the second lens unit at the third position with a first driving condition in a case where the drive of the first lens unit is started from the first position, and controls the drive width of the second lens unit at the third position with a second driving condition in a case where the drive of the first lens unit is started from the second position. Further, the drive width of the second lens unit at the third position with the first driving condition is smaller than that with the second driving condition.

According to another aspect of the present invention, an optical apparatus, which controls the drive of a second lens unit for correcting displacement of an image plane associated with the movement of a first lens unit for variation of magnification, comprising: a memory, which stores data indicating the position of the second lens unit according to the position of the first lens unit; and a controller, which generates lens control information based on the data, and controls the drive of the second lens unit based on the lens control information with a first driving condition corresponding to a case where the first lens unit is located at a predetermined position. The controller controls the drive of the second lens unit with a second driving condition in which the drive width of the second lens unit is smaller than the first driving condition, in a case where the movement of the first lens unit is started from the predetermined position.

According to another aspect of the present invention, an optical apparatus, which controls the drive of a second lens unit for correcting displacement of an image plane associated with the movement of a first lens unit for variation of magnification, comprising: a memory, which stores data indicating the position of the second lens unit according to the position of the first lens unit; and a controller, which generates lens control information based on the data, and controls the drive of the second lens unit based on the lens control information. The controller controls the drive of the second lens unit with a first driving condition, which corresponds to a case where the first lens unit is located at a predetermined position and is different from a reference driving condition based on the lens control information, to perform a regeneration process for regenerating the lens control information based on a focus evaluation signal. The focus evaluation signal is obtained by photoelectric conversion of an optical image formed by an optical system including the first and second lens units, and the focus evaluation signal shows the focus state of the optical system. The controller controls the drive of the second lens unit with a second driving condition in the regeneration process in a case where the drive of the first lens unit is started from the predetermined position, the second driving condition having a smaller difference to the reference driving condition than that of the first driving condition.

According to another aspect of the present invention, a lens control method for controlling the drive of a second lens unit for correcting displacement of an image plane associated with the movement of a first lens unit for variation of magnification, comprising: a first step for storing data indicating the position of the second lens unit according to the position of the first lens unit, the position of the second lens unit including a first position, a second position and a third position, the second position being nearer to the third position than the first position; a second step for generating lens control information based on the data, and for controlling the drive of the second lens unit based on the lens control information. In the second step, the drive width of the second lens unit at the third position is controlled with a first driving condition in a case where the drive of the first lens unit is started from the first position, and the drive width of the second lens unit at the third position is controlled with a second driving condition in a case where the drive of the first lens unit is started from the second position. Further, the drive width of the second lens unit at the third position with the first driving condition is smaller than that with the second driving condition.

According to another aspect of the present invention, a lens control method for controlling the drive of a second lens unit for correcting displacement of an image plane associated with the movement of a first lens unit for variation of magnification, comprising: a first step for storing data indicating the position of the second lens unit according to the position of the first lens unit; and a second step for generating lens control information based on the data, and for controlling the drive of the second lens unit based on the lens control information. In the second step, the drive of the second lens unit is controlled based on the lens control information with a first driving condition corresponding to a case where the first lens unit is located at a predetermined position, and the drive of the second lens unit is controlled with a second driving condition in which the drive width of the second lens unit is smaller than the first driving condition in a case where the movement of the first lens unit is started from the predetermined position.

According to still another aspect of the present invention, a lens control method for controlling the drive of a second lens unit for correcting displacement of an image plane associated with the movement of a first lens unit for variation of magnification, comprising: a first step for storing data indicating the position of the second lens unit according to the position of the first lens unit; and a second step for generating lens control information based on the data, and for controlling the drive of the second lens unit based on the lens control information. In the second step, the drive of the second lens unit is controlled with a first driving condition, which corresponds to a case where the first lens unit is located at a predetermined position and is different from a reference driving condition based on the lens control information, to perform a regeneration process for regenerating the lens control information based on a focus evaluation signal, the focus evaluation signal being obtained by photoelectric conversion of an optical image formed by an optical system including the first and second lens units, and the focus evaluation signal showing the focus state of the optical system. Further, in the second step, the drive of the second lens unit is controlled with a second driving condition in the regeneration process in a case where the drive of the first lens unit is started from the predetermined position, the second driving condition having a smaller difference to the reference driving condition than that of the first driving condition.

Other objects and further features of the present invention will become readily apparent from the following description of the preferred embodiments with reference to accompanying drawings.

BRIEF DESCRIPTION OF THE DRAWINGS

FIG. 11 is a diagram showing an example of a data table of the in-focus cam track.

DETAILED DESCRIPTION OF THE PREFERRED EMBODIMENTS

The preferred embodiments of the present invention will be described below with reference to the drawings.

Prior to describing the embodiments of the present invention, the fundamental art of the present invention will be described.

Figure 9:
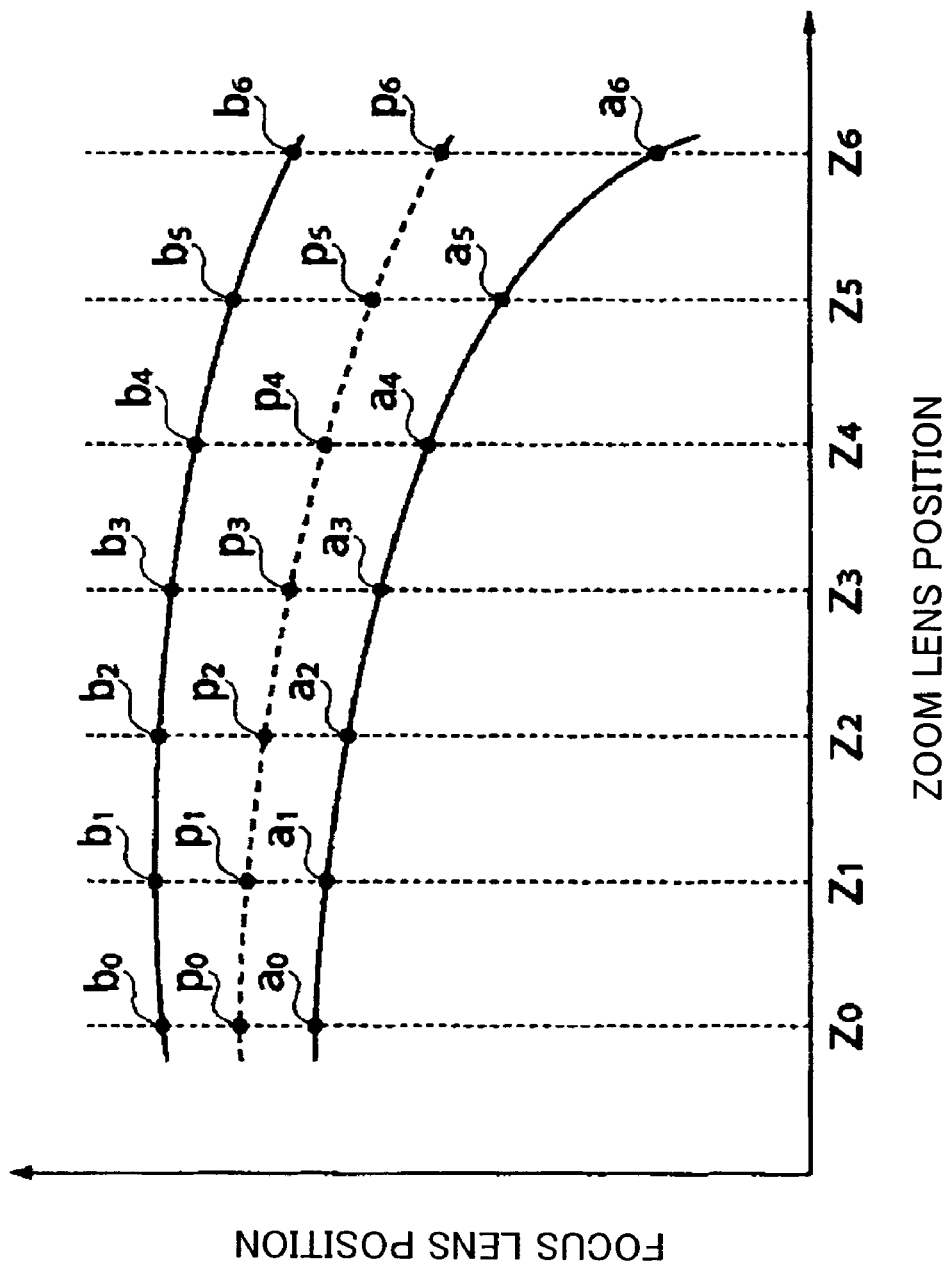
FIG. 9 is a diagram for describing the in-focus cam track.

FIG. 9 is a diagram for describing one example of the cam track following method for a focus lens in an inner focus lens system.

In FIG. 9, $Z_0, Z_1, Z_2, \ldots Z_6$ indicate the positions of a zoom lens (magnification varying lens or variator), and $a_0, a_1, a_2, \ldots a_6$ and $b_0, b_1, b_2, \ldots b_6$ indicate the positions of a focus lens corresponding to two certain object distances, which are stored beforehand in a microcomputer, not shown in the Figure. The group of these focus lens positions ($a_0, a_1, a_2, \ldots a_6$ and $b_0, b_1, b_2, \ldots b_6$) is in-focus cam tracks (representative tracks) that the focus lens should follow at each representative object distance.

Further, $p_0, p_1, p_2, \ldots p_6$ are the positions on the in-focus cam tracks that the focus lens should follow, which are calculated based on the aforementioned two representative tracks. The calculating expression for the positions on the in-focus cam track will be illustrated below.

$$p_{(n+1)} = |p_{(n)} - a_{(n)}| / |b_{(n)} - a_{(n)}| \times |b_{(n+1)} - a_{(n+1)}| a_{(n+1)} \quad (1)$$

According to the above expression (1), for example in the case of FIG. 9 wherein the focus lens is located at $p_0$, the ratio wherein $p_0$ internally divides the line segment $b_0-a_0$ is calculated, and the point that internally divides line segment $b_1-a_1$ according to this ratio is taken as $p_1$. From the difference in position of $p_1-p_0$ and from the time required for the zoom lens to move from $Z_0$ to $Z_1$, the movement speed of the focus lens in order to maintain an in-focus state is determined.

Figure 10:
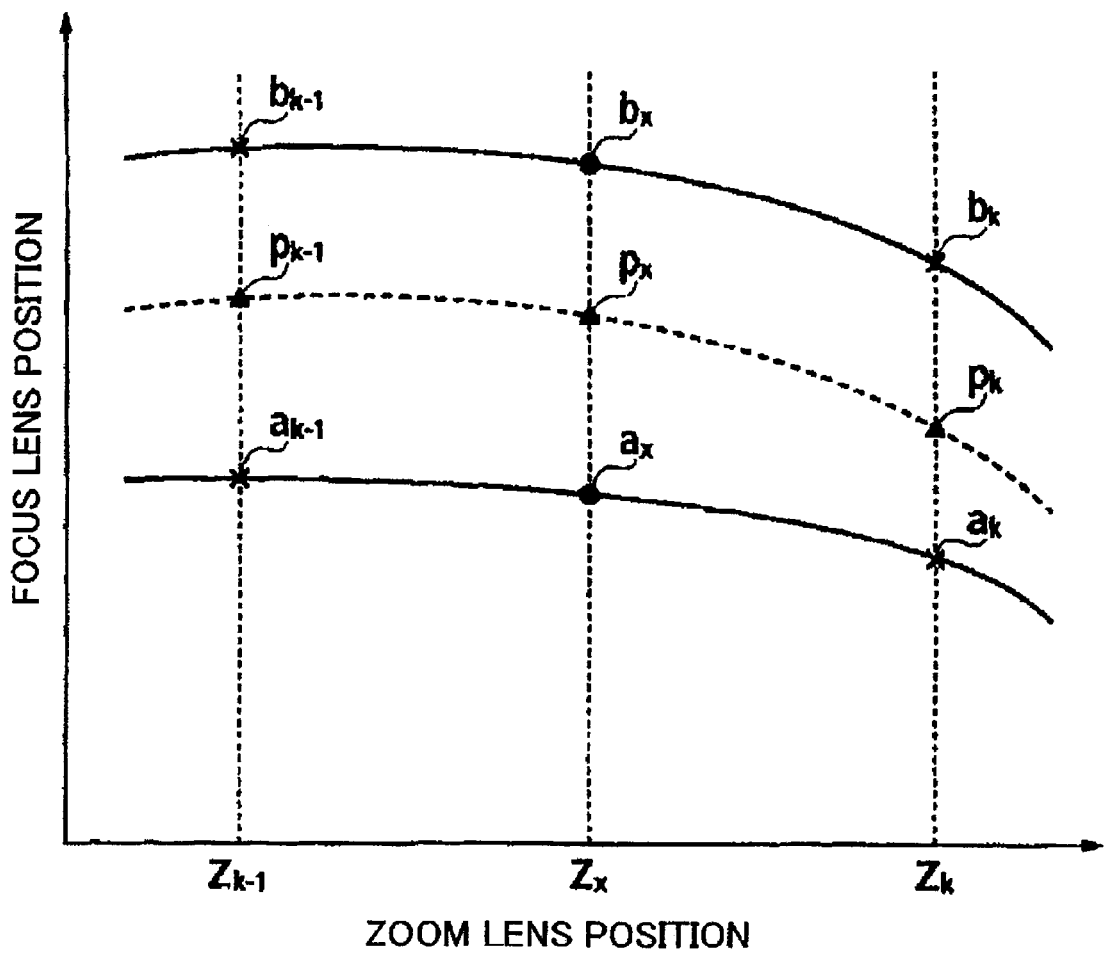
FIG. 10 is a diagram for describing an interpolation method in a movement direction of a zoom lens.

Next, a case in which the stopping position of the zoom lens is not restricted to the boundary of the zoom area that has the stored representative track data will be described. FIG. 10 is a diagram for describing the interpolation method in the zoom lens movement direction, wherein a part of FIG. 9 is extracted and the position of the zoom lens is arbitrary.

In FIG. 10, the vertical axis denotes the focus lens position, and the horizontal axis denotes the zoom lens position. When the zoom lens positions are $Z_0, Z_1, \ldots Z_{k-1}, Z_k, \ldots Z_n$, the focus lens positions on the representative track stored in the microcomputer are, according to the object distance, $a_0, a_1, \ldots a_{k-1}, a_k, \ldots a_n$
$b_0, b_1, \ldots b_{k-1}, b_k, \ldots b_n$.

In a case where the zoom lens position is $Z_x$, which is not on the zoom area boundary, and the focus lens position is $P_x$, then $a_x$ and $b_x$ are calculated as follows:

$$a_x = a_k - (Z_k - Z_x)(a_k - a_{k-1})/(Z_k - Z_{k-1}) \quad (2)$$

$$b_x = b_k - (Z_k - Z_x)(b_k - b_{k-1})/(Z_k - Z_{k-1}) \quad (3)$$

In other words, according to the internal division ratio obtained from the current zoom lens position and the two zoom area boundary positions (for example, $Z_k$ and $Z_{k-1}$ in FIG. 10) that are both sides thereof, $a_x$ and $b_x$ can be calculated by internally dividing two positions corresponding to the same object distance of the stored four focus lens positions on the representative track data ($a_k, a_{k-1}, b_k, b_{k-1}$ in FIG. 10) with the above-described internal division ratio.

Next, according to the internal division ratio obtained from $a_x, p_x$ and $b_x, p_k$ and $p_{k-1}$ can be calculated by internally dividing two positions corresponding to the same focal length of the stored four focus lens positions on the representative track data with the above-described internal division ratio, as in the expression (1).

Then, when zooming from the wide-angle side to the telephoto side, the movement speed of the focus lens in order to maintain an in-focus state is determined from the difference between the focus lens position $p_k$ that is the destination and the current focus lens position $p_x$, and from the time required for the zoom lens to move from $Z_x$ to $Z_k$.

Further, when zooming from the telephoto side to the wide-angle side, the movement speed of the focus lens in order to maintain an in-focus state is determined from the difference between the focus lens position $p_{k-1}$ that is the destination and the current focus lens position $p_x$, and from the time required for the zoom lens to move from $Z_x$ to $Z_{k-1}$.

FIG. 11 shows an example of the table data of the in-focus cam track information stored in the microcomputer beforehand. FIG. 11 shows the focus lens position data $A_{(n, v)}$ according to the object distance, which changes according to the zoom lens position. The object distance changes in the row direction of a variable n, and the zoom lens position (focal length) changes in the column direction of a variable v. Here, n=0 denotes the infinite object distance, and the object distance changes towards the closest distance side as n grows larger. n=m indicates an object distance of 1 cm.

On the other hand, v=0 denotes the wide-angle end. Further, the focal length increases as v grows larger, and v=s denotes the zoom lens position on the telephoto end. Therefore, one column of table data plots one representative track.

Next, as described above, a cam track following method will be described for solving the problem wherein the focus lens cannot find which track to follow when zooming from the wide-angle side to the telephoto side.

Figure 12A:
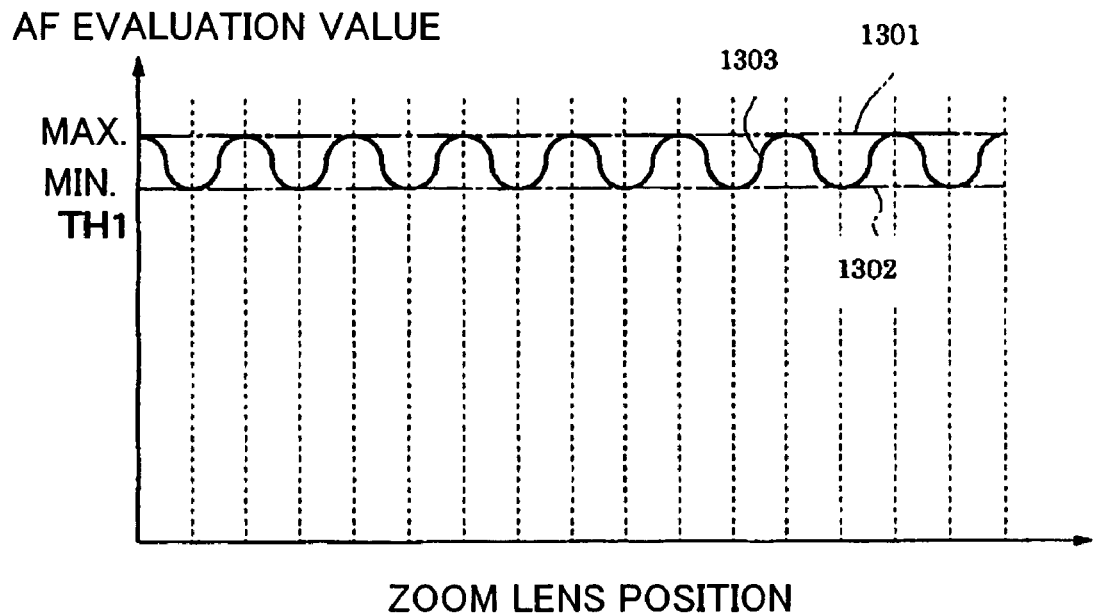
FIGS. 12A, 12B and 13 are schematic views showing the fundamental art of the present invention.
Figure 12B:
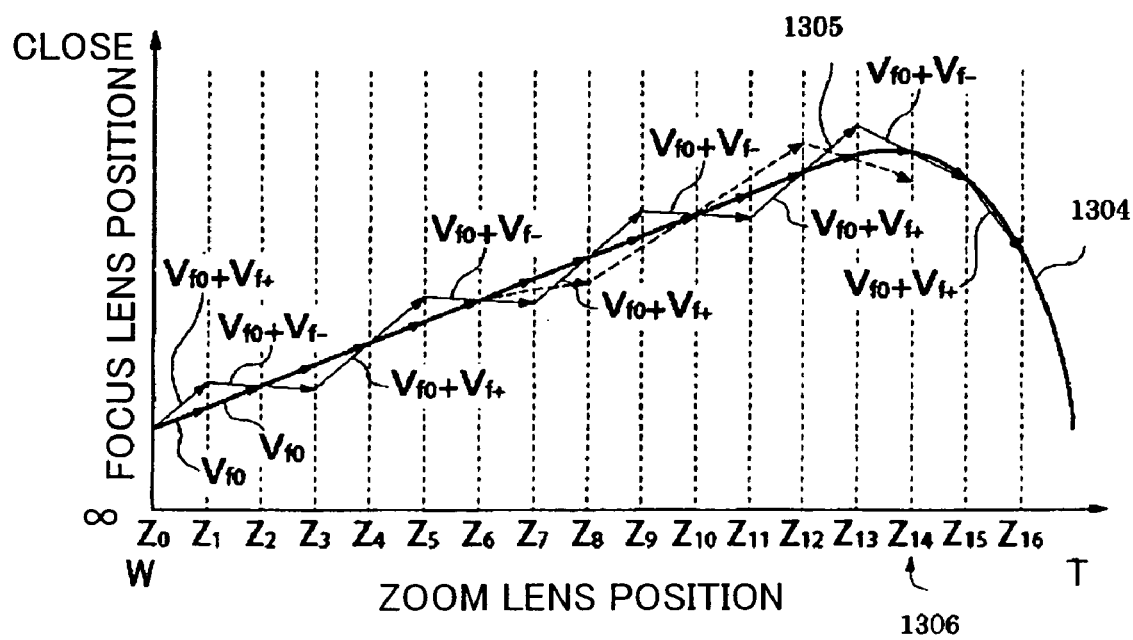

In FIGS. 12A and 12B, the horizontal axis denotes the position of the magnification varying lens (variator). Further, the vertical axis in FIG. 12A denotes the AF evaluation value signal obtained from the image-taking signal by means of the TV-AF method. The AF evaluation value signal shows the level of the high frequency component of the image-taking signal (sharpness signal). Further, the vertical axis in FIG. 12B denotes the focus lens position. In FIG. 12B, reference numeral 1304 denotes the cam track (grouping of the focus lens positions) that the focus lens should follow when zooming while maintaining an in-focus state to an object at a given distance position.

Here, the standard movement speed as the reference driving condition of the focus lens for in-focus cam track following on the wide-angle side further than the zoom lens position 1306 ($Z_{14}$) (the focus lens is moved in the close-distance direction) is made to be positive, and the standard movement speed of the focus lens for in-focus cam track following on the telephoto side further than the zoom lens position 1306 (the focus lens is moved in the infinite direction) is made to be negative. When the focus lens is moved so as to follow the target cam track 1304 while maintaining the in-focus state, the value of the AF evaluation value signal becomes the level denoted by 1301 in FIG. 12A. Generally, with zooming wherein the in-focus state is maintained, the level of the AF evaluation value signal is approximately constant.

In FIG. 12B, the standard movement speed of the focus lens that traces the target cam track 1304 during zooming is $V_{f0}$, and the actual focus lens movement speed is $V_f$. When zooming is performed while increasing and decreasing the movement speed $V_f$ compared to the standard movement speed $V_{f0}$, the track of the focus lens becomes a zigzag track as in 1305 (hereafter, this is referred to as "zigzag correction operation").

At this time, the AF evaluation value signal changes so as to produce mountains and valleys as indicated by 1303 in FIG. 12A. Here, at the position where the target track 1304 and the actual zigzag track 1305 intersect, the AF evaluation value signal 1303 becomes the maximum level 1301 (the even-numbered points of $Z_0, Z_1, Z_2, \ldots Z_{16}$), and at the odd-numbered points of $Z_0, Z_1, Z_2, \ldots Z_{16}$ where the movement direction vector of the actual track 1305 switches, the AF evaluation value 1303 becomes the minimum level 1302.

Then, conversely, if the value TH1 of the minimum level 1302 of the AF evaluation value signal 1303 is set in advance (in other words, an in-focus allowable range is set wherein the AF evaluation value signal of the minimum level TH1 that can be considered to be in the in-focus state is the lower limit), and if the movement direction vector of the track 1305 is switched each time the AF evaluation value signal 1303 becomes the same value as TH1, the focus lens movement direction after switching can be set in the direction in which the focus lens moves closer to the target track 1304. In other words, whenever the image is blurred by the difference of the maximum level 1301 and the minimum level 1302 (TH1) of the AF evaluation value signal, zooming can be performed while suppressing the occurrence of an image blur by controlling the drive direction and drive speed which are driving conditions for the focus lens to reduce the image blur.

Figure 8:
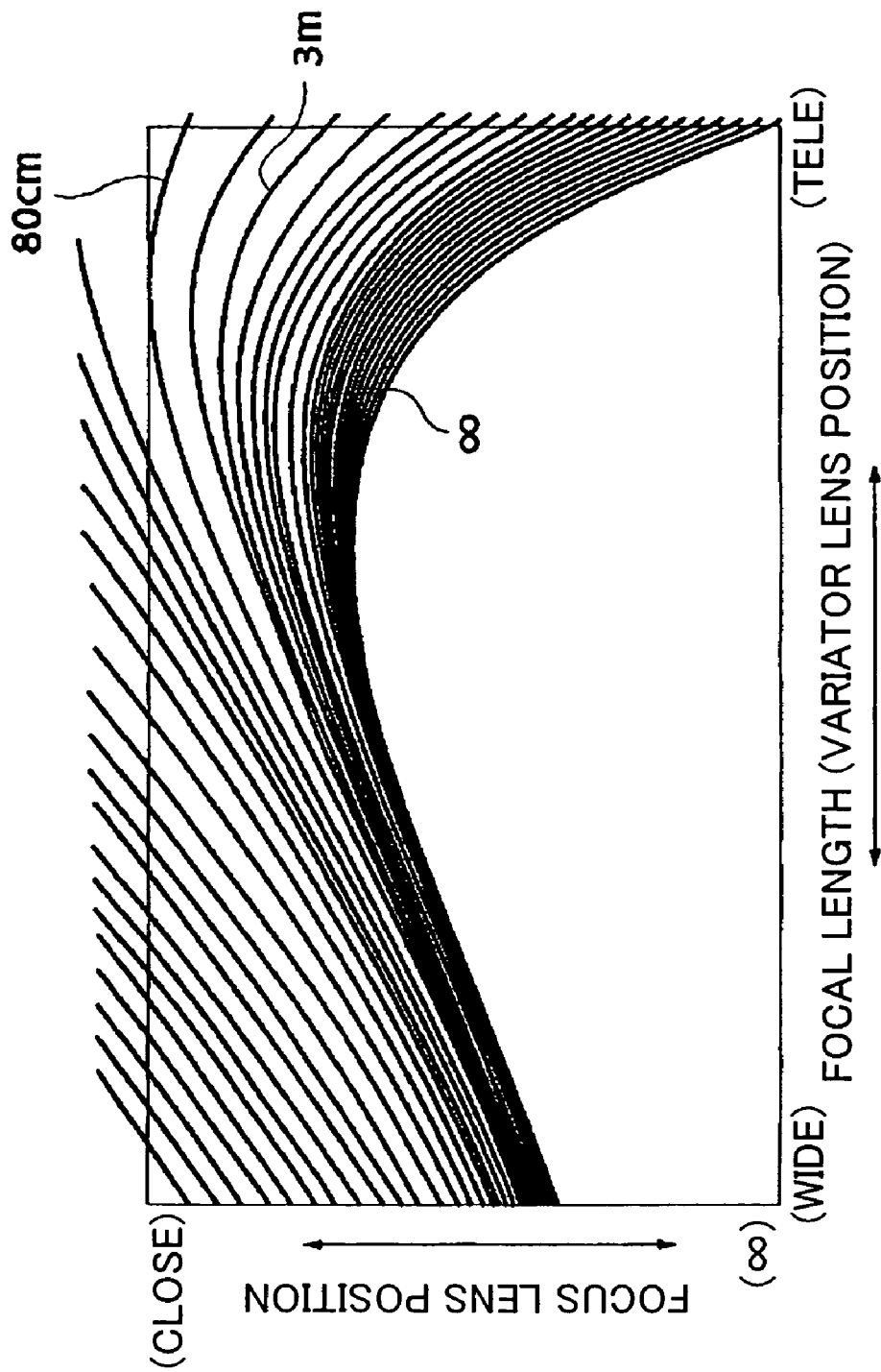
FIG. 8 is a conceptual diagram showing an in-focus cam track according to object distance.

By using this method, as illustrated in FIG. 8, during zooming from wide-angle side to the telephoto side wherein the in-focus tracks corresponding to different object distances disperse from a convergent state, even if the standard movement speed $V_{f0}$ for maintaining an in-focus state is not optimal for the object distance at that time, by repeating the switching operation indicated in the zigzag track 1305 according to the change of the AF evaluation value signal while controlling the movement speed $V_f$ of the focus lens against the standard movement speed (calculated using $P_{(n+1)}$ obtained the expression (1)), re-determination (regeneration) of the in-focus cam track can be performed without the AF evaluation value signal lowering below the minimum level 1302 (TH1), in other words, without producing any more image blur than a predetermined amount. Further, by setting TH1 appropriately, zooming is realized wherein an image blur is imperceptible to the photographer.

Here, the focus lens movement speed $V_f$ is shown as follows when a positive direction correction speed is $V_{f+}$ and a negative direction correction speed is $V_{f-}$:

$$V_f = V_{f0} + V_{f+} \tag{4}$$

or $$V_f = V_{f0} + V_{f-} \tag{5}$$

At this time, the correction speeds $V_{f+}$ and $V_{f-}$ are determined so that the interior angle formed by the two direction vectors of $V_f$ obtained by the expressions (4) and (5) may be divided in half. Thereby, any imbalanced selection of the cam track that should be followed according to the aforementioned zooming method is not produced.

The zooming control described above is generally performed in synchronization with the vertical synchronizing signal of video image because the focus detection is performed using the image-taking signal from the image-pickup device.

Figure 6:
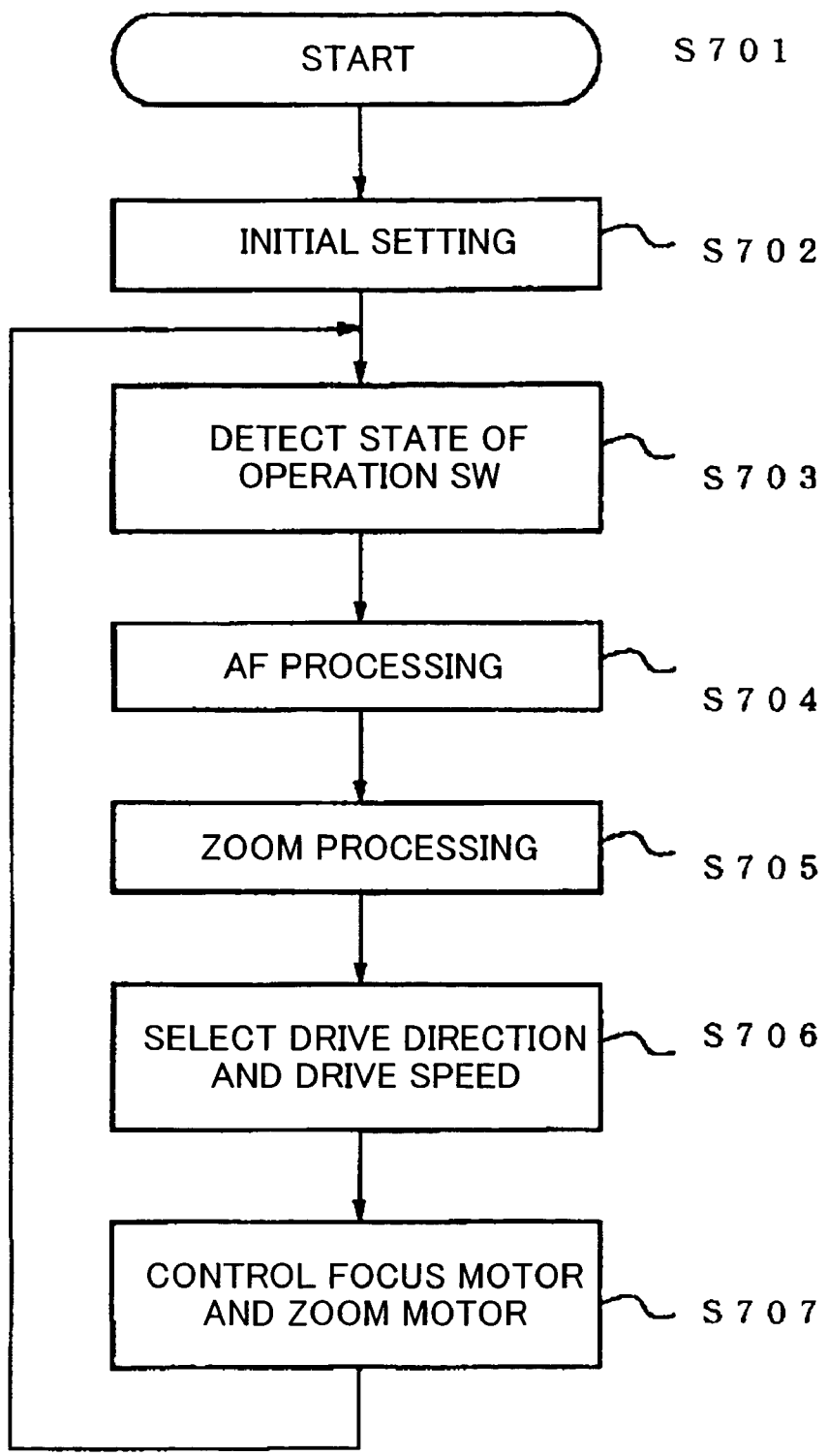

FIG. 6 is a flowchart of the zooming control performed by the microcomputer. Upon processing beginning in step (hereinafter, it is abbreviated to "S") 701, initial settings are made in S702. At the time of initialization, a RAM within the microcomputer and each port is initialized.

In S703, the state of the operating system in the camera main body is detected. In this step, the microcomputer receives information on a zoom switch unit, which is operated by the photographer, and displays information on the magnification varying operation such as the zoom lens position on a display to advise the photographer that it is in the process of zooming.

In S704, AF processing is performed. In other words, automatic focusing processing is performed according to the change of the AF evaluation value signal.

In S705, zooming processing is performed. In other words, compensator operation processing is performed for maintaining the in-focus state during zooming. Specifically, calculations are performed for the standard drive direction and standard drive speed of the focus lens, in order to trace the cam track illustrated in FIG. 8 closely.

S706 is a routine for selecting any of the drive direction or drive speed of the zoom lens or focus lens, that were calculated in the processing routine from S704 to S705, and for driving the zoom lens or focus lens between the telephoto end and the wide-angle end or between the closest distance end and the infinite end. Each end is provided under control by software so that each lens does not hit the mechanical end.

In S707, a control signal is output to a motor driver according to the drive direction information and drive speed information for zooming and focusing determined in S706, and the drive/stop of the lens is controlled. After completing processing in S707, the flow returns to S703.

The series of processes shown in FIG. 6 is performed in synchronization with the vertical synchronizing signal (stands by in the processing of S703 until the next vertical synchronizing signal is input).

Figure 3:
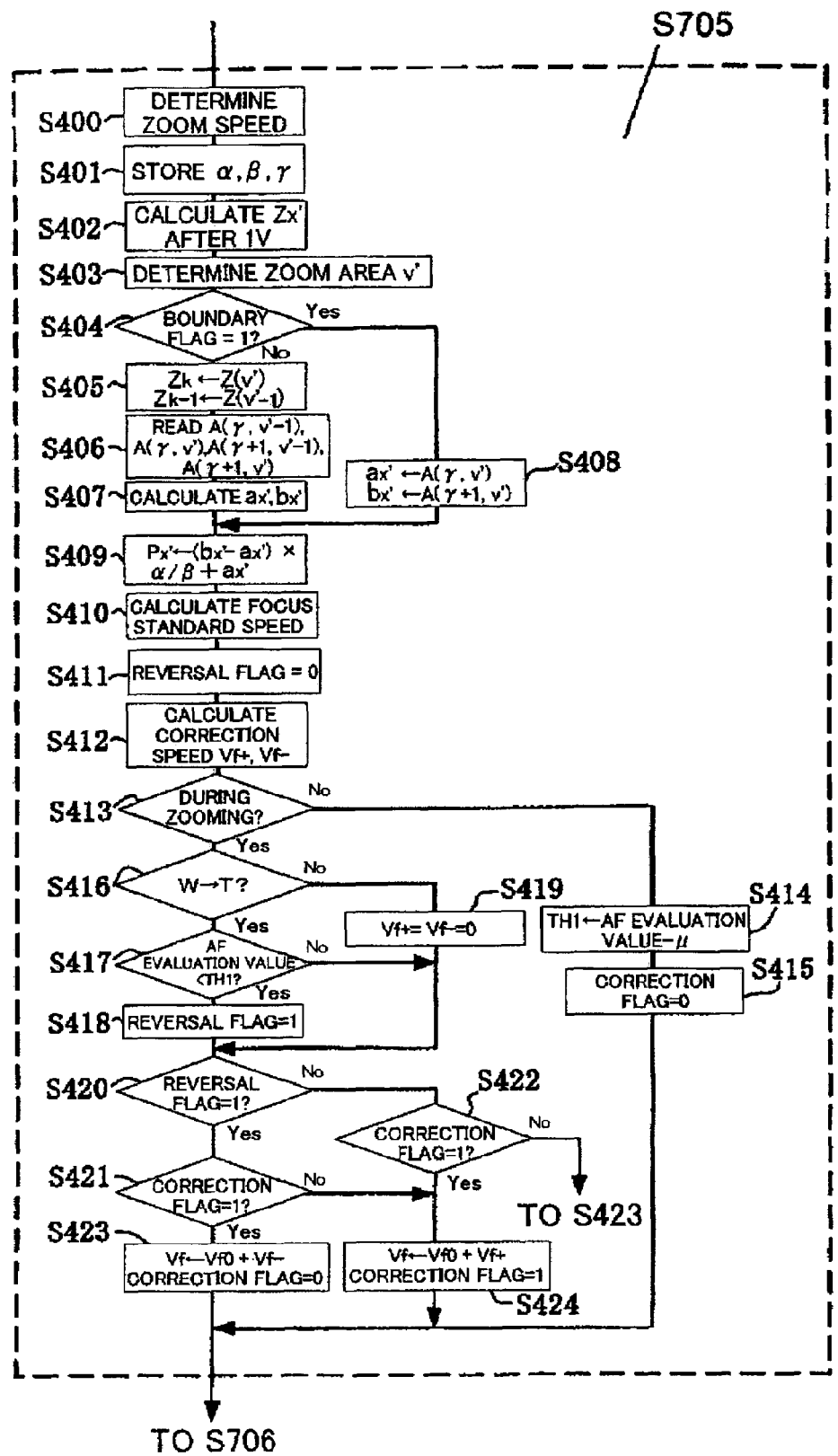
FIGS. 3 to 6 are flowcharts showing the fundamental art of the present invention.

FIG. 3 shows the control flow executed by the microcomputer once every vertical synchronizing time, and shows in detail the content of the processing executed in S705 of FIG. 6. The description below will be given using FIGS. 3 to 5 and FIG. 9.

In S400 in FIG. 3, the drive speed Zsp of a zoom motor is set so as to perform a natural zooming operation, according to the operation information of the zoom switch unit.

Figure 4:
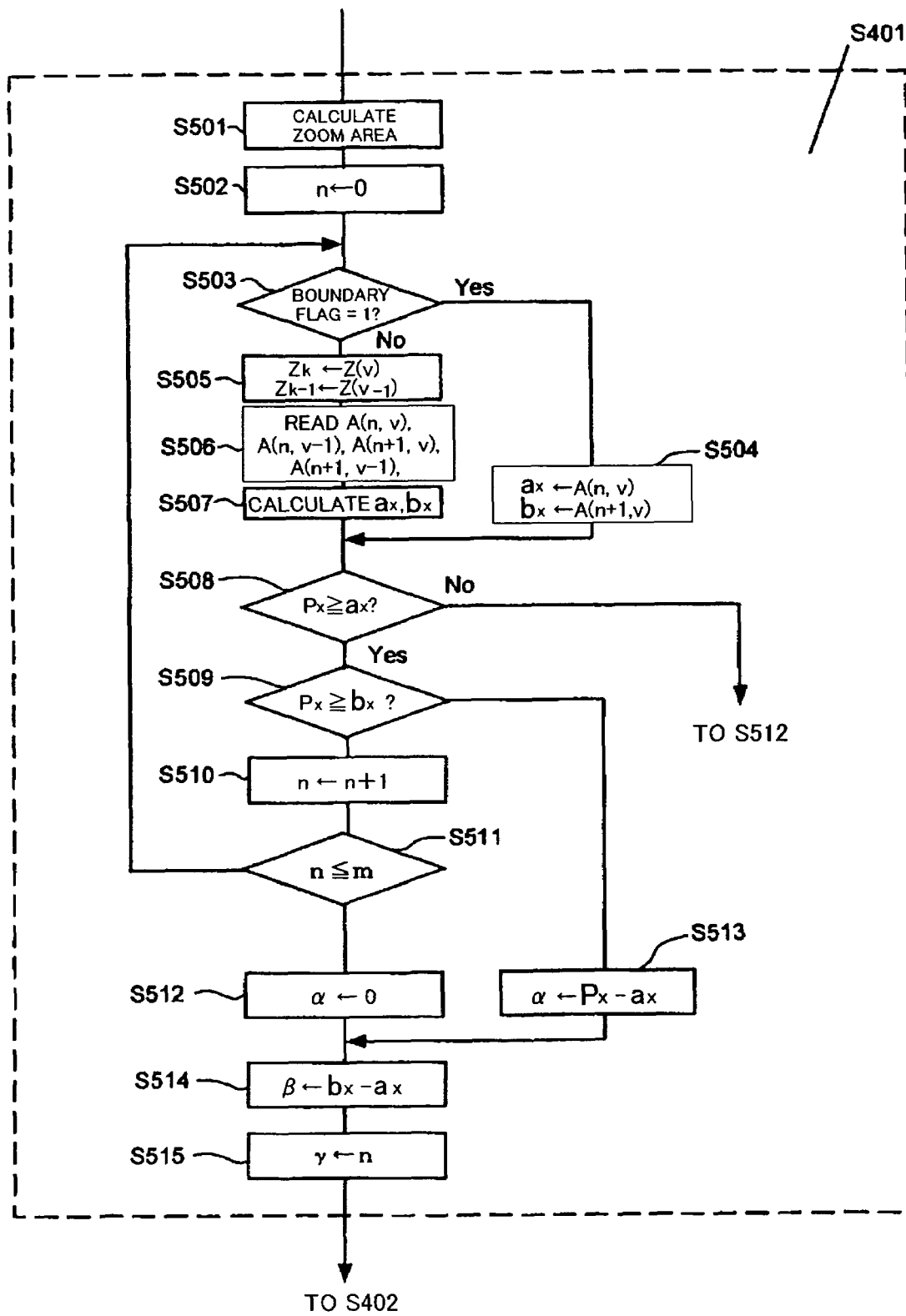

In S401, the distance to the object for image-taking (object distance) is determined (estimated) based on the current positions of the zoom lens and focus lens, and the object distance information is stored into a memory region such as a RAM, as three track parameters (data for obtaining the target position information) α, β and γ. Here, the processing shown in FIG. 4 is performed. Now, in order to simplify the description, the processing shown in FIG. 4 will be described as if an in-focus state is maintained at the current lens position.

In S501 of FIG. 4, which zoom area v in the data table shown in FIG. 11 of s zoom areas the current zoom lens position $Z_x$ is included in, is calculated. The s zoom areas are produced by dividing the entire zoom range from the wide-angle end to the telephoto end into s equal segments. The calculation method will be explained using FIG. 5.

In S601, the zoom area variable v is cleared. In S602, the zoom lens position $Z_{(v)}$ on the boundary of the zoom area v is calculated according to the following expression (6). This $Z_{(v)}$ corresponds to the zoom lens position $Z_0, Z_1, Z_2, \ldots$, shown in FIG. 9.

$$Z_{(v)}=(D-E)\times v/s+E \quad (6)$$

where D denotes the zoom lens position at the telephoto end, and E denotes the zoom lens position at the wide-angle end.

In S603, whether the $Z_{(v)}$ obtained in S602 is equal to the current zoom lens position $Z_x$ is determined. If equal, in S607, 1 is set for a boundary flag. This means that the zoom lens position $Z_x$ is located on the boundary of the zoom area v.

If not equal in S603, in S604, whether $Z_x<Z_{(v)}$ is determined. If Yes in S604, then $Z_x$ is located between $Z_{(v-1)}$ and $Z_{(v)}$, and the boundary flag is set to 0 in S606. If No in S604, then in S605, the zoom area v is incremented and the flow returns to S602.

Figure 5:
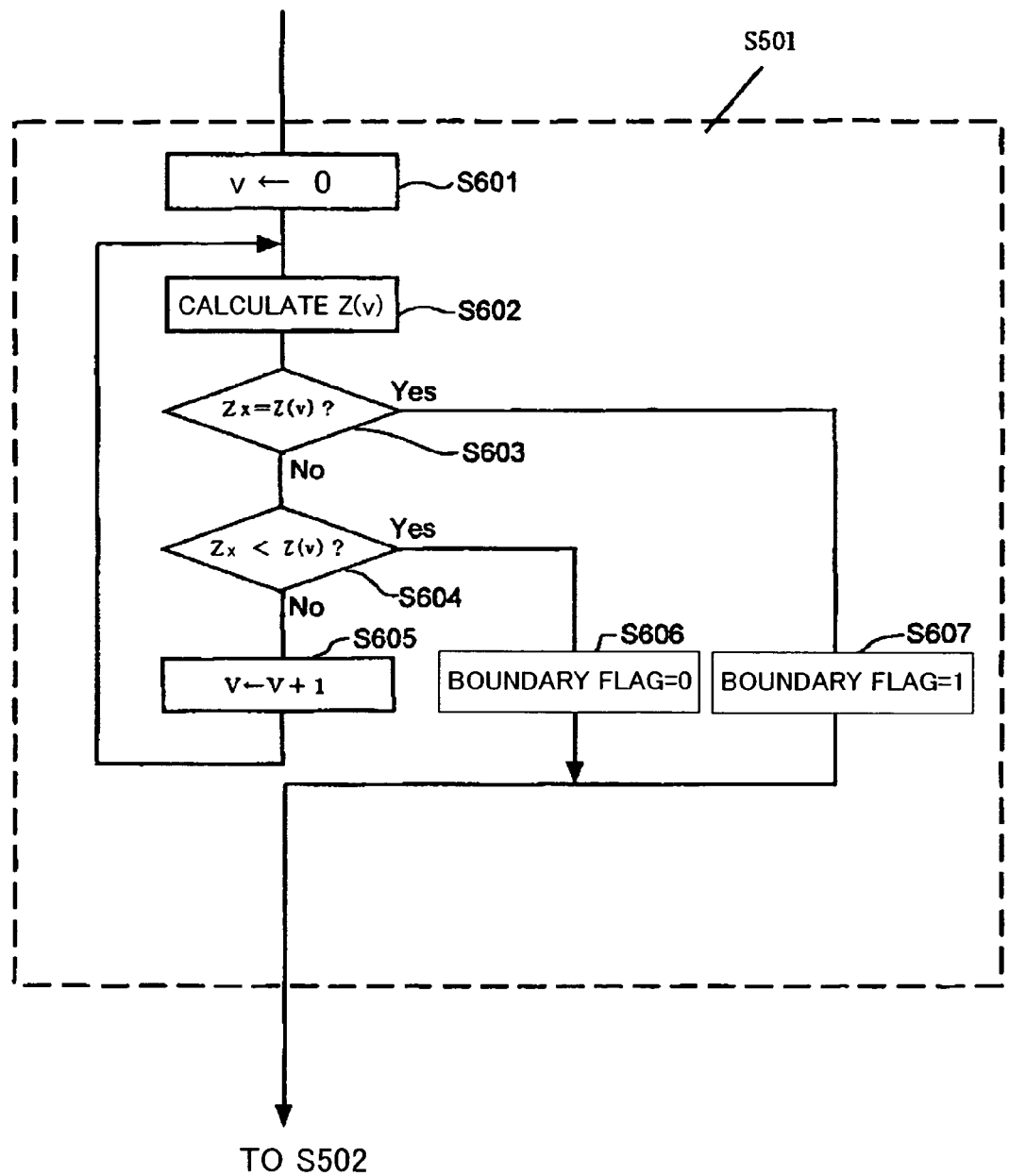

By repeating the above process, whether or not the current zoom lens position $Z_x$ exists in the v=k'th zoom area on the data table in FIG. 11, and whether or not $Z_x$ is located on the zoom area boundary, can be determined at the time of completing the flow shown in FIG. 5.

Returning to FIG. 4, since the current zoom area is determined in S501 by the process in FIG. 5, the following process calculates where the focus lens is located on the data table in FIG. 11.

First, in S502, the object distance variable n is cleared, and in S503, whether the current zoom lens position exists on the boundary of the zoom area is determined. If the boundary flag is 0, it is assumed not to be on the boundary, and the flow continues to the process starting at S505.

In S505, $Z_{(v)}$ is set for $Z_k$, and further $Z_{(v-1)}$ for $Z_{k-1}$. Next, in S506, the four table data elements $A_{(n, v-1)}$, $A_{(n, v)}$, $A_{(n+1, v-1)}$ and $A_{(n+1, v)}$ are read out, and in S507, $a_x$ and $b_x$ are calculated from the above-described expressions (2) and (3).

On the other hand, in the case where the boundary flag is determined to be 1 in S503, in S504, the focus lens position $A_{(n, v)}$ corresponding to the zoom lens position (v in this case) at the object distance n, and the focus lens position $A_{(n+1, v)}$ corresponding to the zoom lens position at the object distance n+1, are read out and each stored in the memory as $a_x$ and $b_x$, respectively.

In S508, whether the current focus lens position $p_x$ is greater than $a_x$ is determined. If greater than $a_x$, in S509, whether or not the current focus lens position $p_x$ is greater than $b_x$ is determined. If not greater than $b_x$, the focus lens position $p_x$ exists between the object distances n and n+1, and the track parameters at this point are stored in the memory from S513 to S515. In S513, $p_x-a_x$ is set for α, in S514, $b_x-a_x$ is set for β, and in S515, n is set for γ.

The case where it is No in S508 is the case where the focus lens position $p_x$ is at the far infinite position. At this time, in S512, α=0 is set, and the flow progresses to S514. In S514, the track parameter for the infinite distance is stored in the memory.

The case where it is Yes in S509 is the case where the focus lens position $p_x$ is at the far close distance position. In this case, the object distance n is incremented in S510, and in S511, whether n is on the side of infinite distance further than the position m corresponding to the far close distance is determined. If on the side of infinite distance further than the position m, the flow returns to S503. The case where it is No in S511 is the case where the focus lens position $p_x$ is at the far close distance position. In this case, the flow progresses to S512, the track parameter for the closest distance is stored in the memory.

Returning to FIG. 3, in S401, as above mentioned, the track parameters is stored in the memory in order to determine the current zoom lens position and the focus lens position on the cam track shown in FIG. 8.

In S402, the zoom lens position $Z_x'$ (the target position from the current position) wherein the zoom lens will arrive after one vertical synchronizing period (1V), is calculated. Here, when the zoom speed determined in S400 is Zsp (pps), the zoom lens position $Z_x'$ after one vertical synchronizing period can be obtained from the expression (7) below. The pps is a unit of the rotation speed of the stepping motor, and denotes the step amount (one step means one pulse) of rotation during one second. Further, the symbols in the expression (7) represent the movement direction of the zoom lens, + meaning the telephoto direction and − meaning the wide angle direction.

$$Z_x'=Z_x+-Zsp/\text{vertical synchronizing frequency} \quad (7)$$

Next, in S403, which zoom area v' wherein $Z_x'$ exists in is determined. In S403, the similar process to the process in FIG. 5 is performed. Here, $Z_x$ in FIG. 5 is substituted with $Z_x'$, and v with v'.

Next, in S404, whether the zoom lens position $Z_x'$ after one vertical synchronizing period exists on the zoom area boundary is determined. If the boundary flag=0, the zoom lens position $Z_x'$ is not considered to be on the boundary, and the flow progresses to S405.

In S405, $Z_{(v')}$ is set for $Z_k$, and $Z_{(v'-1)}$ is set for $Z_{k-1}$. Next, in S406, the four pieces of the table data $A_{(\gamma, v'-1)}$, $A_{(\gamma, v')}$, $A_{(\gamma+1, v'-1)}$, $A_{(\gamma+1, v')}$ in which the object distance γ is specified by the process in FIG. 4 are read out, and $a_x'$ and $b_x'$ are calculated from the expressions (2) and (3) described above in S407.

On the other hand, in the case where it is Yes in S403, in S408, the focus lens position $A_{(\gamma, v')}$ corresponding to the zoom area v' at the object distance γ and the focus lens position $A_{(\gamma+1, v')}$ corresponding to the zoom area v' at the object distance γ+1 are read out, and they are stored in the memory as $a_x'$ and $b_x'$, respectively.

Then in S409, the in-focus position of the focus lens (following target position) $p_x'$ when the zoom lens position reaches $Z_x'$ is calculated. Using the expression (1), the following target position after one vertical synchronizing period can be expressed as follows:

$$P_x' = (b_x' - a_x')x\alpha/\beta + a_x' \qquad (8)$$

Therefore, the difference ΔF of the following target position and the current focus lens position becomes:

$$\Delta F = (b_x' - a_x')x\alpha/\beta + a_x' - P_x.$$

Next, in S410, the focus standard movement speed $V_{f0}$ is calculated. $V_{f0}$ is obtained by dividing the focus lens position difference ΔF by the movement time of the zoom lens required to move this distance ΔF.

The method for calculating the correction speed for correcting the movement speed of the focus lens (zigzag correction operation) shown in FIG. 12B will be described below.

In S411, each parameter is initialized, and the "reversal flag" used in the later processes is cleared. In S412, the correction speeds $V_{f+}$ and $V_{f-}$ for the "zigzag correction operation" are calculated from the focus standard movement speed $V_{f0}$ obtained in S410.

Figure 13:
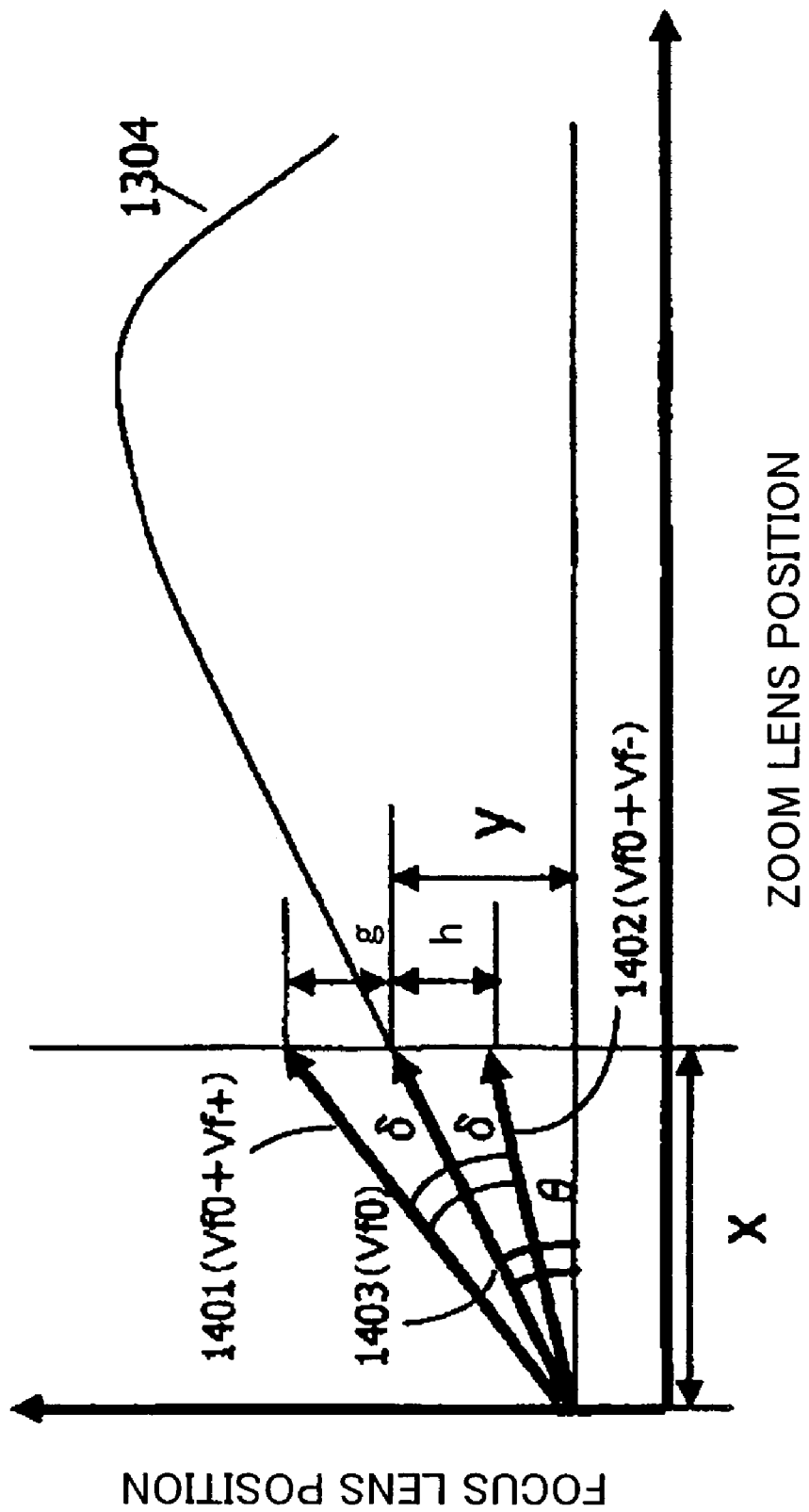

Here, the correction amount parameter δ and the correction speeds $V_{f+}$ and $V_{f-}$ are calculated as follows. FIG. 13 is a diagram to describe the calculation method of the correction speeds $V_{f+}$ and $V_{f-}$ according to the correction amount parameter δ. In FIG. 13, the horizontal axis denotes the zoom lens position, and the vertical axis denotes the focus lens position. Reference numeral 1304 denotes a target cam track that the focus lens should follow.

The focus speed at which the focus lens position changes by an amount of y when the zoom lens position changes by an amount of x (in other words, the focus lens arrives at the following target position), is the standard movement speed $V_{f0}$ calculated for the target cam track 1304. Further, the focus speed at which the focus lens position changes by an amount of h or g, with displacement y as a reference, when the zoom lens position changes by the amount of x, is the correction speed $V_{f+}$ or $V_{f-}$ to be calculated.

Here, h and g are determined so that the direction vector 1401 of the speed to drive to the close distance side further than the displacement y (the speed wherein the positive correction speed $V_{f+}$ is added to the standard movement speed $V_{f0}$), and the direction vector 1402 of the speed to drive to the infinite side further than the displacement y (the speed wherein the negative correction speed $V_{f-}$ is added to the standard movement speed $V_{f0}$), may become direction vectors each forming the same correction angle (correction amount parameter) δ to the direction vector 1403 of the standard movement speed $V_{f0}$.

The correction angle δ corresponds to the difference of the drive speed at the time of the zigzag correction operation (hereinafter, it is refers to as a zigzag drive speed) from the focus standard movement speed $V_{f0}$.

First, g and h are obtained. From FIG. 13, $$\tan\theta = y/x, \tan(\theta-\delta) = (y-g)/x, \tan(\theta+\delta) = (y+h)/x \qquad (9)$$

are obtained.
Further, $$\tan(\theta+-\delta) = (\tan\theta +- \tan\delta)/\{1 +- (-1)x\tan\theta x\tan\delta\} \qquad (10)$$

is obtained.

Further, from the expressions (9) and (10), $$g = (x^2 + y^2)/(x/k + y) \qquad (11)$$

$$h = (x^2 + y^2)/(x/k - y) \qquad (12)$$

where $\tan\delta = k$

Thereby, h and g can be calculated.

Here the correction angle δ is a variable having parameters such as depth of field or focal length. Thereby, the increase/decrease cycle of the AF evaluation value signal that changes according to the driving state of the focus lens can be kept constant with respect to the predetermined change amount of the focus lens position, and the possibility of missing the in-focus cam track that the focus lens should follow during zooming can be reduced.

Concretely, the value of k is stored in the memory in the microcomputer according to the value of δ as the data table, and by reading out it as necessary, the expressions (11) and (12) are calculated.

Here, in the case where the zoom lens position changes by an amount of x each time unit, Zoom speed Zsp=x,
Focus standard speed $V_{f0}$=y, and
Correction speed $V_{f+}$=h, $V_{f-}$=g.

According to this, the correction speeds $V_{f+}$ (positive correction speed) and $V_{f-}$ (negative correction speed) are obtained by the expressions (11) and (12).

In S413, whether or not zooming is being performed is determined, according to the information on the operation state of the zoom switch unit obtained in S703 of FIG. 6. When zooming is being performed, the process from S416 is carried out. When zooming is not being performed, a value obtained by subtracting a arbitrary constant u from the current value of the AF evaluation value signal, is set for TH1 in S414. This TH1 corresponds to the level of the AF evaluation value signal that is the switchover base point for the correction direction vector (switchover base point for the zigzag correction operation) as described in FIG. 12A. This TH1 is determined immediately prior to the start of zooming, and corresponds to the minimum level 1302 in FIG. 12A.

Next, in S415, a correction flag is cleared, and this process ends. Here, the correction flag is a flag indicating whether the cam track following state is under correction in the positive direction (correction flag=1) or under correction in the negative direction (correction flag=0).

In the case where zooming is being performed in S413, determination is made whether or not the zooming direction is from the wide-angle side to the telephoto side in S416. If from the telephoto side to the wide-angle side, $V_{f+}$=0 and $V_{f-}$=0 are set in S419, and the process from S420 is performed. If from the wide-angle side to the telephoto side, in S417, whether or not the current AF evaluation value signal is smaller than TH1 is determined. If equal to or larger than TH1, the flow progresses to S420. If smaller than TH1, in S418, the reversal flag is set to 1 to perform correction direction switching since the current AF evaluation value signal has dropped to below the level of TH1 (1302) in FIG. 12A.

In S420, whether the reversal flag is 1 is determined. In the case where the reversal flag=1, then in S421, whether the correction flag is 1 is determined. If the correction flag is not 1 in S421, then in S424, the correction flag is set to 1 (positive direction correcting state). Further, the focus lens movement speed (zigzag drive speed) $V_f$ is set as follows according to the expression (4), $$V_f = V_{f0} + V_{f+}$$

where $V_{f+} \geqq 0$.

On the other hand, if the correction flag=1 in S421, then in S423, the correction flag is set to 0 (negative direction correcting state). Further, the focus lens movement speed (zigzag drive speed) $V_f$ is set as follows according to the expression (5), $$V_f = V_{f0} + V_{f-}$$

where $V_{f-} \leqq 0$.

Furthermore, in the case where the reversal flag is not 1 in S420, whether the correction flag=1 or not is determined in S422. If the correction flag=1, the flow progresses to S424. If not, the flow progresses to S423.

Figure 7:
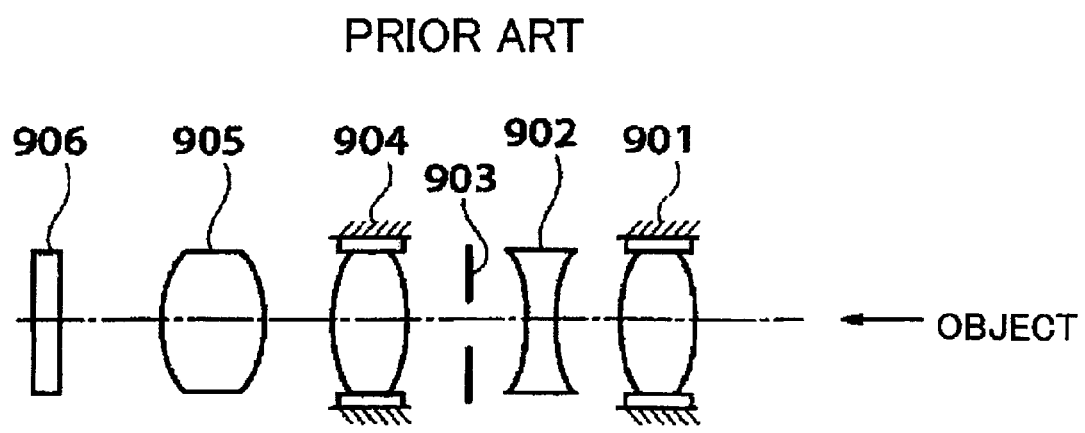
FIG. 7 is a schematic view showing a conventional image-taking optical system.

After completing this process, in S706 in FIG. 7, the focus lens and zoom lens drive directions and drive speeds are selected, according to the operation mode. In the case of zooming operation, the focus lens drive direction is set to the close distance direction or the infinite direction, depending on whether the focus lens movement speed $V_f$ obtained in S423 or S424 is positive or negative. Thus, the cam track to be traced by the focus lens is re-determined as the zigzag correction operation of the focus lens is performed.

The above-described is the fundamental art upon which the present invention has been made, and the description below will be made primarily contrasting the embodiments of the present invention with the fundamental art.

Embodiment

Figure 1:
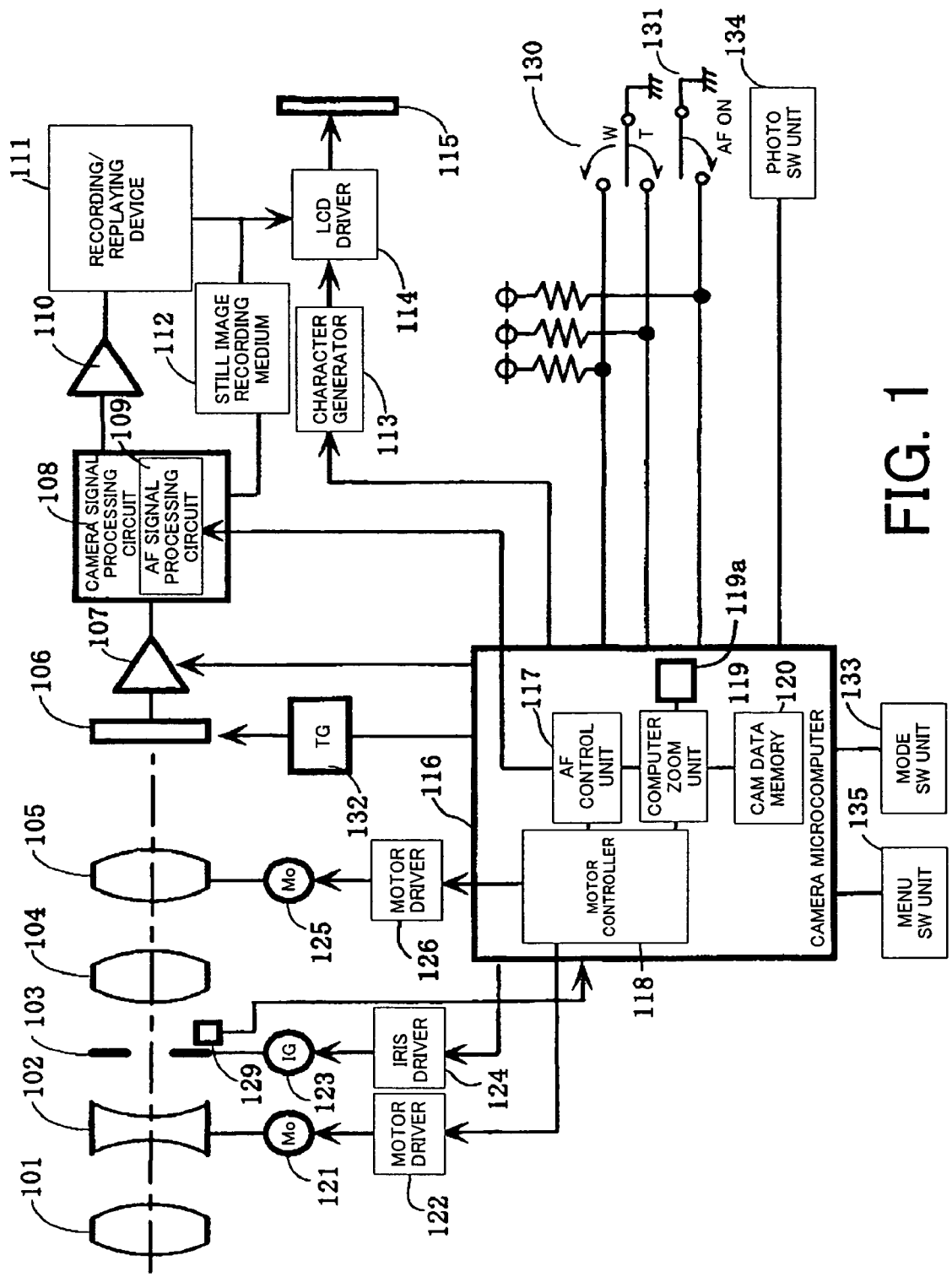
FIG. 1 is a block diagram showing the structure of the video camera of Embodiment 1 of the present invention.

FIG. 1 shows the structure of a video camera as an image-taking apparatus (optical apparatus) that is an embodiment of the present invention. The present embodiment describes an image-taking apparatus having an image-taking lens integrally, to which the present invention is applied, however the present invention can also be applied to an interchangeable lens (optical apparatus) of an image-taking system constituted by the interchangeable lens and a camera main body on which the interchangeable lens is mounted. In this case, a microcomputer in the interchangeable lens performs the later-described zooming operation in response to a signal sent from the side of the camera main body (including an image-taking signal as a photoelectric conversion signal). Further, the present invention can be applied to not only such a video camera but also other image-taking apparatus such as a digital still camera.

In FIG. 1, in order from the object side (left side of the figure), reference numeral 101 denotes a fixed front lens unit, 102 denotes a zoom lens unit (variator) that is a first lens unit, which performs variation of magnification by moving along the optical axis, 103 denotes an aperture diaphragm, 104 is a fixed lens unit. Reference numeral 105 denotes a focus lens unit that is a second lens unit, which provides a focusing function and a compensator function that corrects the displacement of an image plane associated with the variation of magnification, by moving along the optical axis. The image-taking optical system constituted by these lens units is a rear focus optical system having four lens units with positive, negative, positive and positive optical powers in order from the object side. Although each lens unit is constituted by single lens in the figure, in actuality, either a single or multiple lenses may constitute each lens unit.

Reference numeral 106 is an image-pickup device, such as a CCD sensor or a CMOS sensor. The light flux from an object that passes through the image-taking optical system forms an image on the image-taking device 106. The image-pickup device 106 photoelectrically converts the object image formed thereon and outputs an image-taking signal. The image-taking signal is amplified to the optimal level with an amplifier (AGC) 107, and is input into the camera signal processing circuit 108. The camera signal processing circuit 108 converts the input image-taking signal to a standard television signal, and then outputs it to an amplifier 110. The television signal amplified to the optimal level by the amplifier 110 is output to a magnetic recording/replaying device 111, and is recorded on a recording medium such as a magnetic tape, a semiconductor memory or an optical disk.

Further, the television signal amplified by the amplifier 110 is also sent to a LCD driver 114, and is displayed on a LCD 115 as a taken image. The LCD 115 also displays images for displaying image-taking modes, image-taking conditions, or warnings, etc. Such images are displayed by superimposing on the taken image, by means of a camera microcomputer 116 controlling a character generator 113, and mixing the output thereof with the television signal on the LCD driver 114.

On the other hand, the image-taking signal input to the camera signal processing circuit 108 can be simultaneously compressed with an internal memory, and then stored on a still image recording medium 112 such as a card medium.

Further, the image-taking signal input into the camera signal processing circuit 108 is also input into an AF signal processing circuit 109 as a focus signal generator. The AF evaluation value signal that is generated by the AF signal processing circuit 109 is read out as data through transmission with a camera microcomputer 116.

Further, the camera microcomputer 116 reads the states of the zoom switch 130 and AF switch 131, and detects the state of the photo switch 134.

In a state in which the photo switch 134 is half-pressed, the focusing operation by the AF is started, and a focus lock is performed in an in-focus state. Further, in a full-pressed (deep-pressed) state, the focus lock is performed regardless of whether in an in-focus state or an out-of-focus state, image data is taken into a memory (not shown in the figure) in the camera signal processing circuit 108, and then still image recording to the magnetic tape or still image recording medium 112 is performed.

The camera microcomputer 116 determines whether to use a moving-image-taking mode or a still-image-taking mode, according to the state of the mode switch 133, and controls the magnetic recording/replaying device 111 and the still image recording medium 112 via the camera signal processing circuit 108. Thus, a television signal suitable for the recording medium is provided thereto, or replaying control of the recorded television signal from the magnetic recording/replaying device 111 or still image recording medium 112 is performed in a case where the mode switch 133 is set to the playing mode.

A computer zoom unit 119 that is a controller 119, which is included in the camera microcomputer 116, outputs a signal to a zoom motor driver 122 via a motor controller 118 for driving the zoom lens unit 102 in the telephoto direction or wide-angle direction according to the operation direction of the zoom switch 130 by the computer program in the computer zoom unit 119 when the AF switch 131 is off and the zoom switch 130 is being operated. The zoom motor driver 122 receives the signal and drives the zoom lens unit 102 in the corresponding direction via the zoom motor 121. At this time, the computer zoom unit 119 drives a focus motor 125 via the motor controller 118 and a focus motor driver 126 based on the lens cam data (representative track data or track parameter data corresponding to the object distances, as shown in FIG. 11) previously stored in a cam data memory 120, and drives the focus lens unit 105 so as to correct the displacement of the image plane associated with variation of magnification.

Further, an AF control unit 117 in the camera microcomputer 116 drives the focus lens unit 105 by an internal program, based on not only the lens cam data stored in the cam data memory 120 but also the AF evaluation value signal sent from the AF signal processing circuit 109 when the AF switch 131 is on and the zoom switch 130 is being operated. This is because it is necessary to maintain an in-focus state in the magnification varying operation.

Further, the AF control unit 117 outputs a signal to the focus motor driver 126 to drive the focus lens 105 so that the AF evaluation value signal sent from the AF signal processing circuit 109 may become maximum when the AF switch 131 is on and the zoom switch 130 is not operated. Thereby, the focus lens unit 105 is driven via the focus motor driver 126, and an automatic focusing operation is performed.

The camera microcomputer 116 also performs exposure control. The camera microcomputer 116 refers to the brightness level of the television signal formed in the camera signal processing circuit 108, and controls the iris driver 124 to drive an IG meter 123 for controlling the aperture diameter of the diaphragm 103 so that the brightness level may become appropriate for exposure. The aperture diameter of the aperture diaphragm 103 is detected by an iris encoder 129, and feedback control of the aperture diaphragm 103 is performed.

Furthermore, in a case where sufficient exposure control cannot be performed with only the aperture diaphragm 103, the exposure time of the image-pickup device 106 is controlled by a timing generator (TG) 132, and thereby making it possible to perform various types of exposure from a high speed shutter to a long exposure that is a so-called slow shutter. Further, when exposure is insufficient such as image-taking under low lighting, the television signal gain is controlled by the amplifier 107.

By operating a menu switch unit 135, the photographer can manually select the image-taking mode or camera function, which is appropriate for the image-taking condition.

Next, the algorithm during zooming operation will be described with reference to FIGS. 2A and 2B. In the present embodiment, the computer zoom unit 119 in the camera microcomputer 116 executes the below-described operation flow processes, including the aforementioned various operation flows (computer programs).

In the present embodiment, in a case where zooming is started within a predetermined zoom range, the correction intensity (correction angle $\delta$) of the zigzag correction operation for re-determining the in-focus cam track during a predetermined period after the start of zooming (in other words, movement start period) is weakened ($\delta$ is reduced) against the correction intensity that is set after the movement start period.

Figure 2A:
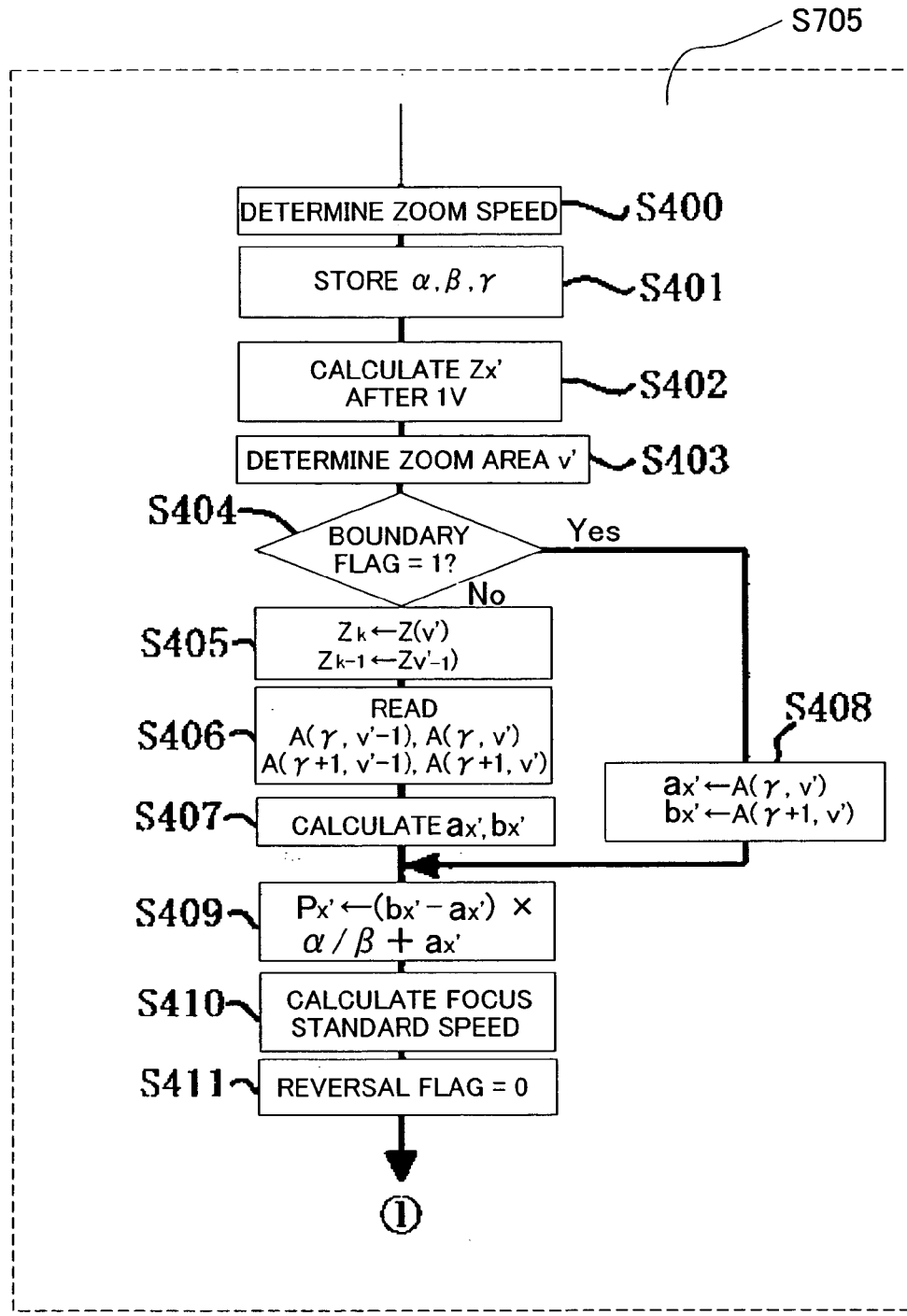
FIGS. 2A and 2B are flowcharts showing the operation of the video camera of Embodiment 1.
Figure 2B:
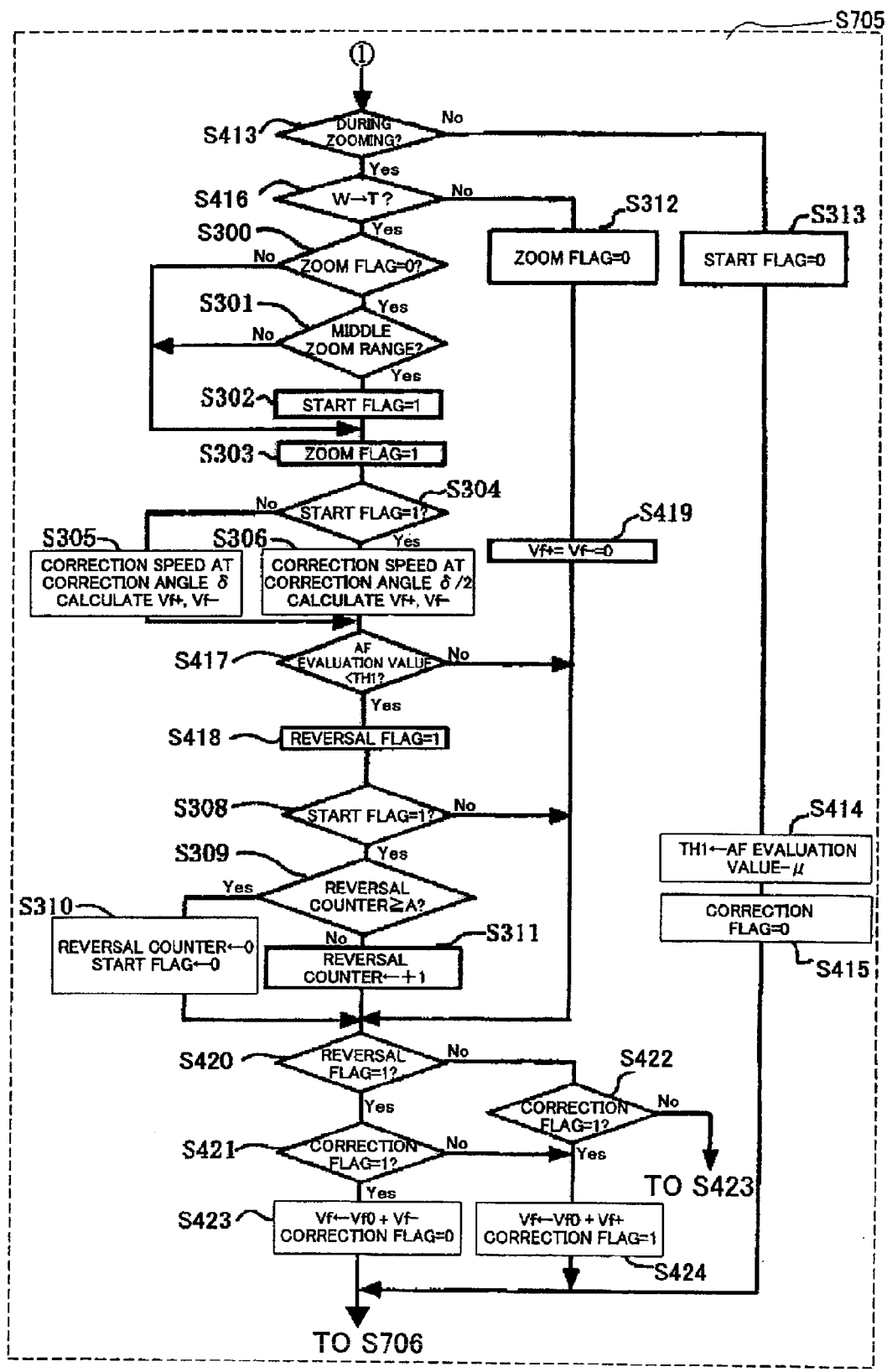

FIGS. 2A and 2B show the processes performed in S705 of FIG. 6 as described previously, and wherein for the processes (steps) that are the same as those in FIG. 3, the same step numbers will be used and only simple description thereof will be made.

In S400, the zoom speed during zooming operation is determined. Next, in S401, which position on the cam tracks shown in FIG. 8 the object for image-taking exists at (that is, object distance) is determined based on the current positions of the zoom lens unit 102 and focus lens unit 105. Concretely, from the cam tracks including virtual cam tracks obtained by the interpolation process based on the cam track data table (FIG. 11) storing the representative cam tracks as discrete data as shown in FIG. 8, the cam track on which the current zoom lens and focus lens positions exist, that is object distance information, is stored in a memory area such as RAM, as three track parameters $\alpha$, $\beta$, and $\gamma$. This process is the same process as that described with reference to FIG. 4.

In S402, the zoom lens position $Z_x'$ wherein the zoom lens will arrive after one vertical synchronizing period, is calculated using the above-described expression (7).

Next, in S403, which zoom area v' wherein $Z_x'$ exists in is determined. Next, in S404, whether the zoom lens position $Z_x'$ after one vertical synchronizing period exists on the zoom area boundary is determined. If the boundary flag=0, the flow progresses to S405. In S405, $Z_{(v')}$ is set for $Z_k$, and $Z_{(v'-1)}$ is set for $Z_{k-1}$.

Next, in S406, four elements of the table data $A_{(\gamma, v'-1)}$, $A_{(\gamma, v')}$, $A_{(\gamma+1, v'-1)}$, $A_{(\gamma+1, v')}$ in which the object distance $\gamma$ is specified by the process in FIG. 4 are read out, and $a_x'$ and $b_x'$ are calculated from the above-described expressions (2) and (3) described above in S407.

On the other hand, in the case where it is Yes in S404, in S408, the focus lens position $A_{(\gamma, v')}$ corresponding to the zoom area v' at the object distance $\gamma$ and the focus lens position $A_{(\gamma+1, v')}$ corresponding to the zoom area v' at the object distance $\gamma$+1 are read out, and they are stored in the memory as $a_x'$ and $b_x'$, respectively.

Then in S409, the in-focus position of the focus lens (following target position) $p_x'$ when the zoom lens position reaches $Z_x'$ is calculated using the above-described expression (8). Further, using the expression (9), the difference $\Delta F$ between the following target position and the current focus lens position is calculated.

Next, in S410, the focus standard movement speed $V_{f0}$ is calculated. Then in S411, each parameter is initialized, and the "reversal flag" used in the later processes is cleared.

In S413, whether or not zooming is being performed is determined. When zooming is being performed, the flow progresses to S416. When zooming is not being performed, the flow progresses to S313.

In S313, the later-described "zoom flag" and "start flag" are cleared, and the next zooming operation from the wide-angle side to the telephoto side is thereby prepared. Then in S414, a value obtained by subtracting an arbitrary constant $\mu$ from the current value of the AF evaluation value signal, is set for TH1. This TH1 corresponds to the level of the AF evaluation value signal that is the switchover base point for the correction direction vector (switchover base point for the zigzag correction operation).

Next, in S415, the correction flag (a flag indicating whether the cam track following state is under correction in the positive direction (=1) or under correction in the negative direction (=0)) is cleared, and this process ends.

In the case where zooming is being performed in S413, determination is made whether or not the zooming direction is from the wide-angle side to the telephoto side in S416. If it is No, the flow progresses to S312. In S312, as S313, the "zoom flag" and "start flag" are cleared, and the next zooming operation from the wide-angle side to the telephoto side is prepared. Next, in S419, $V_{fx}$=0 and $V_{f-}$=0 are set, and the process from S420 is performed. In other words, the zigzag correction operation is not performed substantially.

When it is Yes in S413, the flow progresses to S300, whether the "zoom flag" is cleared or not is determined. The case where the "zoom flag" is cleared here is the case the first zooming from the wide-angle side to the telephoto side is performed this time (in other words, the zooming has been started). In this case, in S301, whether the zoom area wherein the zooming has been started is in the middle zoom range or not is determined.

The middle zoom range is the zoom range where the correction intensity of the zigzag correction operation is increased. When the zoom area wherein the zooming has been started is in the middle zoom range, 1 is set for the "start flag" for indicating that the zooming has been started in the middle zoom range. Further, the flow progresses to S303, 1 is set for the "zoom flag" for indicating the state in which the first zooming from the wide-angle side to the telephoto side is performed.

In a case where 1 has already set for the "zoom flag" in S300, the flow jumps to S303 to hold the state of "zoom flag=1".

When the zoom area wherein the zooming has been started is not in the middle zoom range, the flow skips S302 to hold the "start flag" cleared in S313 and S312.

Next, in S304, whether the "start flag" is 1 or not, that is, the zooming has been started in the middle zoom range or not is determined. When the zooming has been started in a zoom area other than the middle zoom range (start flag=0), the flow progresses to S305.

In S305, the correction angle $\delta$ in the above-described expressions (9) and (10) is set to the normal value $\delta$. Thereby, the correction intensity ("strong correction intensity") stronger than that for the predetermined zooming start period in the case where the zooming is started in the middle zoom range, is set. Furthermore, g and h are calculated from the expressions (11) and (12), and the correction speeds $V_{f+}$ and $V_{f-}$ that are the first driving condition are calculated.

On the other hand, when the zooming has been started in the middle zoom area in S304, the flow progresses to S306. In S306, the correction angle $\delta$ in the above-described expressions (9) and (10) is set to $\delta/2$ to give the "weak correction intensity" as a correction intensity for the zooming start period, which is weaker than the above-described "strong correction intensity".

Namely, $$\tan\theta = y/x, \tan(\theta-\delta/2)=(y-g)/x, \tan(\theta+\delta/2)=(y+h)/x \quad (9)'$$

are obtained.
Further, $$\tan(\theta+-\delta/2)=\{(\tan\theta+-\tan(\delta/2)\}/\{1+-(-1)x\tan\theta x\tan(\delta/2)\} \quad (10)'$$

is obtained.
Further, from the expressions (9)' and (10)', $$g=(x^2+y^2)/(x/k+y) \quad (11)'$$

$$h=(x^2+y^2)/(x/k-y) \quad (12)'$$

where $\tan(\delta/2)=k$

Thereby, h and g can be calculated.

Then, g and h are calculated from the expressions (11)' and (12)', and the correction speeds $V_{f+}$ and $V_{f-}$ are calculated. The zigzag drive speed, which will be calculated later using the correction speeds $V_{f+}$ and $V_{f-}$ calculated in S306 corresponds to the second drive condition.

In both S305 and S306, the correction speeds $V_{f+}$ and $V_{f-}$ at the time of the zigzag correction operation are calculated based on the focus standard movement speed $V_{f0}$ obtained in S410. However, by changing the value of the correction angle that is an element of the calculation, the correction speeds $V_{f+}$ and $V_{f-}$ are accordingly changed.

Since the correction angle 6 corresponds to the difference (or change amount) of the zigzag drive speed from the focus standard movement speed $V_{f0}$, changing the correction angle from $\delta$ to $\delta/2$ corresponds to making the difference of the zigzag drive speed from the focus standard movement speed $V_{f0}$ smaller than that in the case where the correction angle is $\delta$.

In the present embodiment, the case is explained where the correction angle set in S306 is a half angle of the correction angle $\delta$ set in S305. However, the correction angle set in S306 is not limited thereto in the present invention. The correction angle set in S306 can be $\delta/3$, $2\delta/3$ or $3\delta/4$.

As described above, in the present invention, the correction intensity of the zigzag correction operation during the predetermined zooming start period when zooming is started in the middle zoom range is weakened against the correction intensity when zooming is started in a zoom range other than the middle zoom range, and against the correction intensity after the zooming start period when zooming has been started in the middle zoom range. Therefore, the generation of an image blur and the visual recognition of the zigzag correction operation, which are associated with the start of the zigzag correction operation (the start of zooming), are suppressed.

Here, the correction angle $\delta$ ($\delta/2$) is a variable with a parameter such as depth of field or depth of focus, and is also a variable with focal length as a parameter as described in the fundamental art. Therefore, the correction intensity is changed according to the change of the focal length after the start of zooming.

However, in the present embodiment, by slowing the correction speed by reducing the correction angle $\delta$ to $\delta/2$ during the predetermined zooming start period (concretely, until the number of reversals (changeovers) of the correction direction reaches a predetermined number, as described later), the generation of an image blur and the visual recognition of the displacement of the image plane, which are associated with the zigzag correction operation during the zooming start period, are suppressed. This differs from a case where the correction speed is merely changed according to the focal length.

After the correction intensity (correction speed) for the zooming start period was thus set according to the zooming start zoom range, the zigzag correction operation is executed while a weighting process of the zigzag correction operation (process for changing the correction angle from $\delta/2$ to $\delta$) is performed during the zooming operation in the case where the zooming has been started from the middle zoom range, and while the correction angle is set to $\delta$ in the case where the zooming has been started from a zoom range other than the middle zoom range.

First, in S417, whether the current AF evaluation value signal is smaller than TH1 or not is determined. If smaller, 1 is set for the reversal flag in S418.

Next, in S308, whether the "start flag" is 1 or not, in other words, whether the zigzag correction operation with the "weak correction intensity" is being performed according to the first telephoto-direction zooming started from the middle zoom range or not, is determined. If it is No, the flow progresses to S420. In S420, whether the reversal flag is 1 or not is determined. If the reversal flag is 1, whether the correction flag is 1 or not is determined in S421. If the correction flag is not 1, 1 (indicating the positive direction correction) is set for the correction flag in S424, and the focus speed $V_f(=V_{f0}+V_{f+})$ is calculated using the above-described expression (4).

On the other hand, if the correction flag is 1 in S421, the flow progresses to S423. In S423, the correction flag is set to 1 (indicating the negative direction correction), and the focus speed $V_f(=V_{f0}+V_{f\pm})$ is calculated using the above-described expression (5).

When the reversal flag is not 1 in S420, whether the correction flag is 1 or not is determined. The flow progresses to S424 if it is Yes, and to S423 if it is No.

After this process, in S706 of FIG. 6, the drive directions and drive speeds of the focus lens unit 105 and zoom lens unit 102 are selected according to the operation mode. In zooming operation, the focus drive direction is set to the close-distance direction or infinite direction according to whether the focus speed $V_f$ obtained in S423 or S424 is positive or negative. The re-determination (regeneration) of the cam track that should be followed is performed while the zigzag correction operation is thus performed.

Further, when it is Yes in S308, that is, when the zigzag correction operation with the "weak correction intensity" is being performed, the flow progresses to S309.

The process from S309 to S311 is a process for releasing the state in which the zigzag correction operation at the correction speeds $V_{f+}$ and $V_{f-}$ determined in S306 according to the correction angle $\delta/2$ is being performed, and for changing the state to a state in which the zigzag correction operation at the correction speeds determined in S305 according to the correction angle $\delta$ is performed.

In S309, whether the number of reversals (changeovers) of the correction direction in the zigzag correction operation, which is counted by a reversal counter 119a in the microcomputer 116, reach a predetermined number A or not, is determined. When the number of reversals are equal to or more than the predetermined number A, the reversal counter 119a and "start flag" are cleared in S310. When the number of reversals are less than the predetermined number A, the reversal counter 119a is incremented in S311 because the reversal flag is set to 1 in S418 this time.

This is equivalent to counting the number of the drop of the AF evaluation value below the level of TH1 shown in FIG. 12A. The above-described change process of the correction intensity is a process for controlling the change of the correction intensity to the same intensity as in the normal zigzag correction operation when the number of the drop of the AF evaluation value below the level of TH1 reaches the predetermined number A, while the zigzag correction operation is performed to determine the cam track that should be followed.

In other words, after the suppression of the generation of an image blur has been made by weakening the correction intensity for the zooming start period in the middle zoom range, the correction intensity is strengthened at the point having a positional deviation corresponding to the difference to TH1 in the AF evaluation value from the in-focus cam track. Therefore, it is possible to perform the zigzag correction operation in the right correction direction to the next in-focus position with the strong correction intensity. Thereby, the following responsiveness to the cam track can be heightened.

Then, in the process from S420 to S424 described above, the zigzag drive speed is calculated by adding the correction speed to the standard movement speed, and the zigzag correction operation is performed.

Here, for example, when zooming is started from the zoom lens position $Z_6$ in FIG. 12B, the movement track of the focus lens unit 105 in the case where the re-determination of the cam track with the "weak correction intensity" becomes a track as shown by the dotted arrows in the figure from the zoom lens position $Z_6$ to the zoom lens position $Z_{12}$.

The FIG. 12B shows that the re-determination of the cam track with the "weak correction intensity" is performed to the zoom lens position where the correction direction has reversed twice. However, the re-determination of the cam track with the "weak correction intensity" can be performed to the zoom lens position where the correction direction has reversed once or more than three times.

After that (zoom position further than $Z_{12}$ in the figure), from the point having the positional deviation, the correction intensity is changed to the "strong correction intensity", and the focus lens unit 105 is moved so as to draw the movement track shown by the dotted arrow in the figure.

By performing the above-described processes, it is possible to control the zigzag correction operation so that the generation of an image blur from the in-focus state before zooming and the visual recognition of the image plane displacement associated with the zigzag correction operation can be suppressed, especially even if the zooming is started in the middle zoom range wherein the strong correction intensity is set. Furthermore, it is possible to continue the zigzag correction operation by changing the weak correction intensity to the strong correction intensity at the point having a positional deviation corresponding to a predetermined blur amount from the in-focus cam track. Therefore, it is certainly possible to maintain the in-focus state even if a zooming operation with a camera work is performed, and thereby making it possible to achieve a high quality zooming performance with an extremely small image blur.

In the above-described embodiment, the case where the correction intensity at the start time of zooming from the wide-angle side to the telephoto side in the middle zoom range is set to be weak was explained. However, the correction intensity can be set to be weak when zooming is started from a zoom range other than the middle zoom range or when zooming from the telephoto side to the wide-angle side is started.

Furthermore, in the above-described embodiment, the weak correction intensity is changed to the strong correction intensity when the number of the drop of the AF evaluation value below the level of TH1 reaches the predetermined number A. However, the weak correction intensity can be changed to the strong correction intensity when a predetermined time has elapsed after the start of zooming.

This application claims foreign priority benefits based on Japanese Patent Application No. 2004-145524, filed on May 14, 2004, which is hereby incorporated by reference herein in its entirety as if fully set forth herein.

What is claimed is:

1. An optical apparatus, which controls the drive of a second lens unit for correcting displacement of an image plane associated with the movement of a first lens unit for variation of magnification, comprising:

a memory, which stores data indicating the position of the second lens unit according to the position of the first lens unit, the position of the second lens unit including a first position, a second position and a third position, the second position being between the first position and the third position; and a controller, which generates lens control information based on the data, and controls the drive of the second lens unit based on the lens control information, wherein the controller controls the drive width of the second lens unit at the third position with a first driving condition in a case where the drive of the first lens unit is started from the first position, and controls the drive width of the second lens unit at the third position with a second driving condition in a case where the drive of the first lens unit is started from the second position, and wherein the drive width of the second lens unit at the third position with the second driving condition is smaller than that with the first driving condition.

2. An optical apparatus, which controls the drive of a second lens unit for correcting displacement of an image plane associated with the movement of a first lens unit for variation of magnification, comprising:
   a memory, which stores data indicating the position of the second lens unit according to the position of the first lens unit; and
   a controller, which generates lens control information based on the data, and controls the drive of the second lens unit based on the lens control information with a first driving condition corresponding to a case where the first lens unit is located at a predetermined position,
   wherein the controller controls the drive of the second lens unit with a second driving condition in which the drive width of the second lens unit is smaller than the first driving condition, in a case where the movement of the first lens unit is started from the predetermined position.

3. The optical apparatus according to claim 1, wherein the controller sets the second driving condition in a predetermined range of the entire movable range of the first lens unit.

4. The optical apparatus according to claim 3, wherein the predetermined range is a middle zoom range between a telephoto end and a wide-angle end.

5. The optical apparatus according to claim 1, wherein the controller sets the first and second driving conditions so that the value of a focus evaluation signal may repeatedly increase and decrease in a predetermined in-focus range, the focus evaluation signal being obtained by photoelectric conversion of an optical image formed by an optical system including the first and second lens units, and showing the focus state of the optical system.

6. The optical apparatus according to claim 1, wherein the controller changes the second driving condition to the first driving condition when a predetermined time has elapsed after the start of the of the movement of the first lens unit.

7. The optical apparatus according to claim 6, wherein the controller changes the second driving condition to the first driving condition when the number of increases and decreases of a focus evaluation signal reaches a predetermined number, the focus evaluation signal being obtained by photoelectric conversion of an optical image formed by an optical system including the first and second lens units, and showing the focus state of the optical system.

8. The optical apparatus according to claim 1, wherein the lens control information is movement track information indicating the positions of the second lens unit according to the positions of the first lens unit.

9. The optical apparatus according to claim 1, wherein the first and second driving conditions are the driving speed of the second lens unit.

10. The optical apparatus according to claim 1, wherein the controller performs a regeneration process for regenerating the lens control information based on a focus evaluation signal, the focus evaluation signal being obtained by photoelectric conversion of an optical image formed by an optical system including the first and second lens units, and showing the focus state of the optical system.

11. An optical apparatus, which controls the drive of a second lens unit for correcting displacement of an image plane associated with the movement of a first lens unit for variation of magnification, comprising:
   a memory, which stores data indicating the position of the second lens unit according to the position of the first lens unit; and
   a controller, which generates lens control information based on the data, and controls the drive of the second lens unit based on the lens control information,
   wherein the controller controls the drive of the second lens unit with a first driving condition, which corresponds to a case where the first lens unit is located at a predetermined position and is different from a reference driving condition based on the lens control information, to perform a regeneration process for regenerating the lens control information based on a focus evaluation signal, the focus evaluation signal being obtained by photoelectric conversion of an optical image formed by an optical system including the first and second lens units, and the focus evaluation signal showing the focus state of the optical system, and
   wherein the controller controls the drive of the second lens unit with a second driving condition in the regeneration process in a case where the drive of the first lens unit is started from the predetermined position, the second driving condition having a smaller difference to the reference driving condition than that of the first driving condition.

12. The optical apparatus according to claim 11, wherein the controller sets the second driving condition in a predetermined range of the entire movable range of the first lens unit.

13. The optical apparatus according to claim 12, wherein the predetermined range is a middle zoom range between a telephoto end and a wide-angle end.

14. The optical apparatus according to claim 11, wherein the controller sets the first and second driving conditions so that the value of the focus evaluation signal may repeatedly increase and decrease in a predetermined in-focus range.

15. The optical apparatus according to claim 11, wherein the controller sets the first driving condition in the regeneration process after the start period of the movement of the first lens unit.

16. The optical apparatus according to claim 15, wherein the controller changes the second driving condition to the first driving condition when the number of increases and decreases of the focus evaluation signal reaches a predetermined number after the start period of the movement of the first lens unit in the regeneration process.

17. The optical apparatus according to claim 11, wherein the lens control information is movement track information indicating the positions of the second lens unit according to the positions of the first lens unit.

18. The optical apparatus according to claim 11, wherein the reference, first and second driving conditions are the driving speed of the second lens unit.

19. A lens control method for controlling the drive of a second lens unit for correcting displacement of an image plane associated with the movement of a first lens unit for variation of magnification, comprising:
   a first step for storing data indicating the position of the second lens unit according to the position of the first lens unit, the position of the second lens unit including a first position, a second position and a third position, the second position being between the first position and the third position;
   a second step for generating lens control information based on the data, and for controlling the drive of the second lens unit based on the lens control information,
   wherein, in the second step, the drive width of the second lens unit at the third position is controlled with a first driving condition in a case where the drive of the first lens unit is started from the first position, and the drive width of the second lens unit at the third position is controlled with a second driving condition in a case where the drive of the first lens unit is started from the second position, and wherein the drive width of the second lens unit at the third position with the second driving condition is smaller than that with the first driving condition.

20. A lens control method for controlling the drive of a second lens unit for correcting displacement of an image plane associated with the movement of a first lens unit for variation of magnification, comprising:

a first step for storing data indicating the position of the second lens unit according to the position of the first lens unit; and a second step for generating lens control information based on the data, and for controlling the drive of the second lens unit based on the lens control information, wherein, in the second step, the drive of the second lens unit is controlled based on the lens control information with a first driving condition corresponding to a case where the first lens unit is located at a predetermined position, and the drive of the second lens unit is controlled with a second driving condition in which the drive width of the second lens unit is smaller than the first driving condition in a case where the movement of the first lens unit is started from the predetermined position.

21. A lens control method for controlling the drive of a second lens unit for correcting displacement of an image plane associated with the movement of a first lens unit for variation of magnification, comprising:

a first step for storing data indicating the position of the second lens unit according to the position of the first lens unit; and a second step for generating lens control information based on the data, and for controlling the drive of the second lens unit based on the lens control information, wherein, in the second step, the drive of the second lens unit is controlled with a first driving condition, which corresponds to a case where the first lens unit is located at a predetermined position and is different from a reference driving condition based on the lens control information, to perform a regeneration process for regenerating the lens control information based on a focus evaluation signal, the focus evaluation signal being obtained by photoelectric conversion of an optical image formed by an optical system including the first and second lens units, and the focus evaluation signal showing the focus state of the optical system, and wherein, in the second step, the drive of the second lens unit is controlled with a second driving condition in the regeneration process in a case where the drive of the first lens unit is started from the predetermined position, the second driving condition having a smaller difference to the reference driving condition than that of the first driving condition.

* * * * *